United States Patent
Michiyama et al.

(10) Patent No.: US 12,229,808 B2
(45) Date of Patent: Feb. 18, 2025

(54) CONTROL METHOD, FUND MANAGEMENT SYSTEM, RECORDING MEDIUM, AND DATA STRUCTURE

(71) Applicant: Panasonic Intellectual Property Corporation of America, Torrance, CA (US)

(72) Inventors: Junji Michiyama, Fukuoka (JP); Junichiro Soeda, Nara (JP); Yuji Unagami, Osaka (JP); Yuuki Hirose, Osaka (JP); Tetsuji Fuchikami, Osaka (JP); Motoji Ohmori, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 776 days.

(21) Appl. No.: 17/157,163

(22) Filed: Jan. 25, 2021

(65) Prior Publication Data
US 2021/0142371 A1    May 13, 2021

Related U.S. Application Data

(63) Continuation of application No. PCT/JP2019/041227, filed on Oct. 18, 2019.
(Continued)

(51) Int. Cl.
*G06Q 30/0279* (2023.01)
*G06Q 20/06* (2012.01)
(Continued)

(52) U.S. Cl.
CPC ..... *G06Q 30/0279* (2013.01); *G06Q 20/0658* (2013.01); *G06Q 20/3672* (2013.01); *G06Q 20/405* (2013.01); *G06Q 20/407* (2013.01)

(58) Field of Classification Search
None
See application file for complete search history.

(56) References Cited

U.S. PATENT DOCUMENTS

| | | | |
|---|---|---|---|
| 2019/0108499 A1* | 4/2019 | Liu | G06Q 20/10 |
| 2020/0058055 A1* | 2/2020 | Simha | G06Q 20/3825 |
| 2020/0090140 A1* | 3/2020 | Seol | G06Q 50/01 |
| 2020/0143014 A1* | 5/2020 | LeBeau | G06Q 20/3827 |
| 2020/0160408 A1* | 5/2020 | Natarajan | G06Q 30/0279 |

FOREIGN PATENT DOCUMENTS

| | | |
|---|---|---|
| CA | 2 997 631 | 3/2017 |
| CN | 106464662 | 2/2017 |

(Continued)

OTHER PUBLICATIONS

International Search Report (ISR) issued on Jan. 7, 2020 in International (PCT) Application No. PCT/JP2019/041227.

(Continued)

*Primary Examiner* — Jan P Mincarelli
(74) *Attorney, Agent, or Firm* — Wenderoth, Lind & Ponack, L.L.P.

(57) ABSTRACT

A control method of a fund management system including a plurality of servers that hold a distributed ledger, and executed by one of the plurality of servers, includes: receiving transaction data, the transaction data pertaining to payment processing for payment of a token from one or more applicants of crowdfunding to a management account, and storing the transaction data that is received in the distributed ledger held in each of the plurality of servers; determining, using a smart contract, whether or not a target condition of the crowdfunding is met; and outputting information indicating a result of the determining.

14 Claims, 20 Drawing Sheets

Related U.S. Application Data

(60) Provisional application No. 62/748,616, filed on Oct. 22, 2018.

(51) Int. Cl.
*G06Q 20/36* (2012.01)
*G06Q 20/40* (2012.01)

(56) References Cited

FOREIGN PATENT DOCUMENTS

| | | | |
|---|---|---|---|
| CN | 108513669 | 9/2018 | |
| JP | 2017-156927 | 9/2017 | |
| JP | 2017-204034 | 11/2017 | |
| JP | 2018-113009 | 7/2018 | |
| WO | WO-2020141360 A1 * | 7/2020 | ............ G06Q 20/02 |

OTHER PUBLICATIONS

Atsushi Watanabe, et al., "Introduction to block chain application—Introduction to developing smart contracts using Ethereum", SHOEISHA, Aug. 2017, pp. 138-159 with English translation.

Yosuke Watanabe, "Distributed service of occupancy grid maps using block chain technology", the 10th Data Engineering and Information Management 2018 (DEIM2018), Mar. 2018 with partial English translation.

Office Action and search report issued Dec. 1, 2023 in corresponding Chinese patent application No. 201980046642.6, with partial English language translation.

* cited by examiner

| SOLICITOR ID | PROJECT ID | MANAGEMENT ACCOUNT ID | PROVIDER ACCOUNT ID | SOLICITATION PERIOD |
|---|---|---|---|---|
| aaa001 | kdfjafjpo34 | moaq68079 | fljad4019 | 2018.10.10 15:00:00 |

| TARGET AMOUNT | PAYMENT AMOUNT | CONTRACT CODE | SIGNATURE |
|---|---|---|---|
| 100 | 1 | ... | 89ag0hfah92349 |

FIG. 4

| APPLICANT ACCOUNT ID | PROJECT ID | MANAGEMENT ACCOUNT ID | PAYMENT AMOUNT | SENDING DATE/TIME | SIGNATURE |
|---|---|---|---|---|---|
| aab0aab | kdfjafjpo34 | moaq68079 | 1 | 2018.10.11 07:00:00 | hfaiop94e30u7tghvbua |

FIG. 5

| APPLICANT ACCOUNT ID | PROJECT ID | MANAGEMENT ACCOUNT ID | REFUND AMOUNT | SENDING DATE/TIME | SIGNATURE |
|---|---|---|---|---|---|
| aab0aab | kdfjafjpo34 | moaq68079 | 1 | 2018.10.31 00:00:00 | igbjpq05f41v8uhiwcvb |

FIG. 15

| APPLICANT | PAID-IN AMOUNT |
|---|---|
| A | 10 |
| B | 5 |
| C | 20 |
| D | 24 |
| E | 100 |
| F | 60 |

FIG. 16

(1) FIRST TURN (S301) PAYMENT AMOUNT = 100/6 ≒ 17 TOKENS/PERSON
(S303) EXCLUDE APPLICANTS A AND B (2) SECOND TURN (S301) PAYMENT AMOUNT = 100/4 = 25 TOKENS/PERSON
(S303) EXCLUDE APPLICANTS C AND D (3) THIRD TURN (S301) PAYMENT AMOUNT = 100/2 = 50 TOKENS/PERSON

APPLICANTS E AND F PAY

CONTROL METHOD, FUND MANAGEMENT SYSTEM, RECORDING MEDIUM, AND DATA STRUCTURE

CROSS REFERENCE TO RELATED APPLICATIONS

This application is a U.S. continuation application of PCT International Patent Application Number PCT/JP2019/041227 filed on Oct. 18, 2019, claiming the benefit of priority of U.S. Provisional Patent Application No. 62/748,616 filed on Oct. 22, 2018, the entire contents of which are hereby incorporated by reference.

BACKGROUND

1. Technical Field

The present disclosure relates to a control method, a fund management system, a recording medium, and a data structure.

2. Description of the Related Art

An information processing device which aims to promote the spread of crowdfunding has been proposed (see Japanese Unexamined Patent Application Publication No. 2017-156927).

However, there is a problem in that in crowdfunding, participants may engage in behavior such as improperly interfering with fundraising, improperly obtaining funds which have been raised, and so on.

Accordingly, the present disclosure provides a control method and the like which appropriately manage fundraising in crowdfunding.

SUMMARY

A control method according to one aspect of the present disclosure is a control method of a fund management system including a plurality of servers that hold a distributed ledger. The control method is executed by one of the plurality of servers. The control method includes: receiving transaction data, the transaction data pertaining to payment processing for payment of a token from one or more applicants of crowdfunding to a management account, and storing the transaction data that has been received in the distributed ledger held in each of the plurality of servers; determining, using a smart contract, whether or not a target condition of the crowdfunding is met; and outputting information indicating a result of the determining.

Note that these comprehensive or specific aspects may be realized by a system, a device, an integrated circuit, a computer program, or a computer-readable recording medium such as a CD-ROM, or may be implemented by any desired combination of systems, devices, integrated circuits, computer programs, and recording media.

The control method according to the present disclosure can appropriately manage fundraising in crowdfunding.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

FIG. 4 is a diagram schematically illustrating payment transaction data according to Embodiment 1;

FIG. 5 is a diagram schematically illustrating reimbursement transaction data according to Embodiment 1;

FIG. 15 is a diagram illustrating examples of maximum payment amounts for applicants, according to Embodiment 3;

FIG. 16 is a diagram illustrating an example of the progress of execution, and a result, of the algorithm used by the controller to determine a payment amount, according to Embodiment 3;

DETAILED DESCRIPTION OF THE EMBODIMENTS

Figure 1:
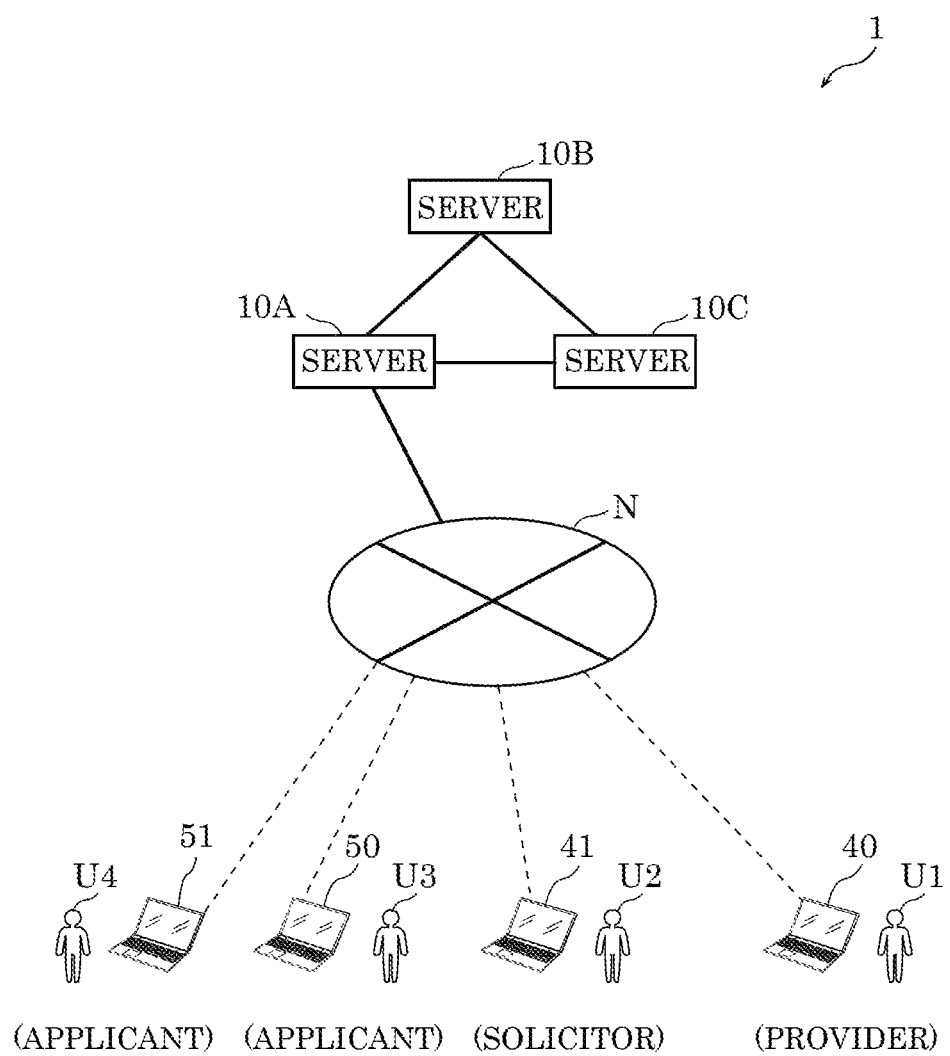
FIG. 1 is a block diagram schematically illustrating the configuration of a fund management system according to Embodiment 1.

Findings Serving as Basis of Present Disclosure

The inventors of the present disclosure discovered that the technique pertaining to crowdfunding described above in the Background section has the following problems.

"Crowdfunding" is a system for taking funds provided by one or more persons (also called "supporters") for a project (e.g., creating and providing new content) and providing those funds to a content provider on the Internet. This system makes it possible for the content provider to raise funds for the project.

An information processing device which aims to promote the spread of crowdfunding has been proposed (see Japanese Unexamined Patent Application Publication No. 2017-156927). The technique described in Japanese Unexamined Patent Application Publication No. 2017-156927 is a technique which makes it possible to promote the spread of crowdfunding by conducting crowdfunding at event venues.

However, there is a problem in that in crowdfunding, participants may engage in behavior such as improperly interfering with fundraising, improperly obtaining funds which have, been raised, and so on. Specifically, a supporter can improperly interfere with fundraising by withdrawing their intent to provide funding after the supporter has provided their intent to do so. Additionally, a malicious party can improperly obtain some or all of provided funds by falsifying information pertaining to provided funds.

Accordingly, the present disclosure provides a control method and the like which appropriately manage fundraising in crowdfunding.

To address the issues described above, a control method according to one aspect of the present disclosure is a control method of a fund management system including a plurality of servers that hold a distributed ledger. The control method is executed by one of the plurality of servers. The control method includes: receiving transaction data, the transaction data pertaining to payment processing for payment of a token from one or more applicants of crowdfunding to a management account, and storing the transaction data that has been received in the distributed ledger held in each of the plurality of servers; determining, using a smart contract, whether or not a target condition of the crowdfunding is met; and outputting information indicating a result of the determining.

According to this aspect, the server stores information pertaining to the payment processing of tokens in crowdfunding in the distributed ledger as the transaction data. Because it is substantially impossible to tamper with transaction data which has been stored in a distributed ledger, the information pertaining to the payment processing of tokens in crowdfunding is appropriately managed. Additionally, the determination as to whether or not the target condition of the crowdfunding has been met is made through a smart contract, and the determination can therefore be made automatically and securely without going through another party or another system. Accordingly, the control method according to the present disclosure can appropriately manage fundraising in crowdfunding.

For example, whether or not the target condition has been met may be determined by determining whether or not a total of tokens paid through the payment processing involving the transaction data received during a solicitation period of the crowdfunding is at least a target amount of the crowdfunding at a point in time when the solicitation period ends.

According to this aspect, the server determines whether or not the target condition has been met by comparing the total of the tokens paid through the payment processing with the target amount at the point in time when a predetermined solicitation period of the crowdfunding ends, and thus the determination can be made more easily. Accordingly, the control method according to the present disclosure can appropriately manage fundraising in crowdfunding more easily.

For example, whether or not the target condition has been met may be determined by determining, when the transaction data is received, whether or not a total of tokens paid through payment processing involving past transaction data, the past transaction data being transaction data received before the transaction data is received, is at least a target amount of the crowdfunding.

According to this aspect, the server determines whether or not the target condition has been met by comparing the total of the tokens paid through the payment processing with the target amount at the point in time when transaction data involved in the payment processing is received, and thus the determination can be made more easily. Accordingly, the control method according to the present disclosure can appropriately manage fundraising in crowdfunding more easily.

For example, when a determination that the target condition is not met is made, the control method may further include: generating, based on information indicating a result of the determination, transaction data pertaining to reimbursement processing of reimbursing each of the one or more applicants from the management account with a token paid to the management account through the payment processing; and storing the transaction data that has been generated in the distributed ledger held in each of the plurality of servers.

According to this aspect, the server also executes the reimbursement processing of tokens, using the smart contract, when the target condition of the crowdfunding is not met. The reimbursement processing of the tokens is therefore made automatically and securely without going through another party or another system. Accordingly, the control method according to the present disclosure can appropriately manage fundraising in crowdfunding.

For example, the transaction data pertaining to the payment processing may include a predetermined amount of tokens to be paid by each of the one or more applicants, and the payment processing may be processing in which each of the one or more applicants pays the predetermined amount of tokens.

According to this aspect, the server appropriately manages information pertaining to payment processing in which each of the one or more applicants pays a predetermined amount of tokens. Accordingly, the control method according to the present disclosure can appropriately manage fundraising in crowdfunding.

For example, the payment processing may be processing in which a specified amount of tokens specified by each of the one or more applicants is paid, and the control method may further include reimbursement processing in which after the payment processing, each of the one or more applicants is reimbursed with an amount of tokens obtained by subtracting, from the specified amount of tokens, an amount obtained by equally dividing a target amount of the crowdfunding among the one or more applicants.

According to this aspect, the server appropriately manages information pertaining to payment processing in which each of the one or more applicants pays an amount of tokens obtained by equally distributing a predetermined amount of tokens among the one or more applicants. Accordingly, the control method according to the present disclosure can appropriately manage fundraising in crowdfunding.

For example, in the reimbursement processing, when an amount of tokens obtained by equally dividing the target amount of the crowdfunding among the one or more applicants exceeds the amount of tokens paid by one applicant of the one or more applicants through the payment processing, the one applicant may be excluded from the one or more applicants, and the target amount of the crowdfunding may be equally divided among the one or more applicants aside from the one applicant.

According to this aspect, the payment amount for the applicant is determined so as not to exceed the specified amount specified by each applicant. Accordingly, the control method according to the present disclosure can appropriately manage fundraising in crowdfunding while keeping the payment amount within a range that does not exceed a maximum amount.

For example, the control method may further include generating, by a terminal of a solicitor of the crowdfunding, a code pertaining to the smart contract, and storing transaction data including the code that has been generated in the distributed ledger held in each of the plurality of servers.

According to this aspect, a contract code of the smart contract used in the process of determining whether or not the target condition has been met can be generated by the solicitor. Accordingly, by generating a contract code reflecting the intentions of the solicitor, a conditional determination which further reflects the intentions of the solicitor can be made. Accordingly, the control method according to the present disclosure can appropriately manage fundraising in crowdfunding while making it possible to further reflect the intentions of the solicitor.

For example, when storing the transaction data in the distributed ledger held in the plurality of servers, the transaction data may be stored in the distributed ledger after each of the plurality of servers executes a consensus algorithm.

According to this aspect, the server stores the data in the distributed ledger after the consensus algorithm is executed. Accordingly, by executing the consensus algorithm, the fundraising in the crowdfunding can be managed appropriately more easily.

Additionally, a fund management system according to one aspect of the present disclosure is a fund management system including a plurality of servers that hold a distributed ledger. The fund management system includes: a processor that receives transaction data, the transaction data pertaining to payment processing for payment of a token from one or more applicants of crowdfunding to a management account, and stores the transaction data that has been received in the distributed ledger held in each of the plurality of servers; and a controller that determines, using a smart contract, whether or not a target condition of the crowdfunding has been met, and outputs information indicating a result of the determination.

This aspect provides the same effects as the above-described control method.

Additionally, a recording medium according to one aspect of the present disclosure is a non-transitory computer-readable recording medium in which is recorded a program for causing a computer to execute the control method described above.

This aspect provides the same effects as the above-described control method.

Additionally, a data structure according to one aspect of the present disclosure is a data structure used in a fund management system including a plurality of servers that hold a distributed ledger. The data structure includes: identification information capable of uniquely identifying a project of crowdfunding; an identifier of an account of an applicant who pays a token in the project; an identifier of a management account that receives payment of the token in the project; information indicating an amount of tokens paid by the applicant in the project; and an electronic signature of the applicant.

This aspect provides the same effects as the above-described fund management system.

Note that these comprehensive or specific aspects may be realized by a system, a method, an integrated circuit, a computer program, or a computer-readable recording medium such as a CD-ROM, or may be implemented by any desired combination of systems, devices, methods, integrated circuits, computer programs, or recording media.

Embodiments will be described in detail hereinafter with reference to the drawings.

Note that the following embodiments describe comprehensive or specific examples of the present disclosure, The numerical values, shapes, materials, constituent elements, arrangements and connection states of constituent elements, steps, orders of steps, and the like in the following embodiments are merely examples, and are not intended to limit the present disclosure. Additionally, of the constituent elements in the following embodiments, constituent elements not denoted in the independent claims, which express the broadest interpretation, will be described as optional constituent elements.

Embodiment 1

The present embodiment will describe a fund management system that appropriately manages fundraising in crowdfunding, a control method for such a system, and the like. A unit in which funds are raised in such fundraising may be referred to as a "project". Here, the "project" is assumed to be a project involving the provision of content. In a project, a party providing the content will be called a "provider", a party soliciting funding for the content will be called a "solicitor", and a party applying for funding will be called an "applicant". A given project will be referred to as "successful" when applications amounting to a designated target amount of funding have been received within a solicitation period specified for that given project.

FIG. 1 is a block diagram schematically illustrating the configuration of fund management system 1 according to the present embodiment.

As illustrated in FIG. 1, fund management system 1 includes servers 10A, 10B, and 10C, and terminals 40, 41, 50, and 51. The devices included in fund management system 1 are communicatively connected to each other by network N. Network N may be constituted by any type communication line or network, including, for example, the Internet, a mobile phone carrier network, or the like. Servers 10A, 10B, and 10C may also be referred to simply as "servers 10A and the like".

Server 10A is one of the plurality of servers 10A, 10B, and 10C which manage crowdfunding performed by fund management system 1. Server 10A is one of the plurality of servers 10A, 10B, and 10C which holds a distributed ledger. The distributed ledger held by server 10A stores various types of transaction data pertaining to solicitation, payment, and reimbursement for crowdfunding. By receiving the transaction data, server 10A handles solicitation, payments, and reimbursements for the crowdfunding. Note that the funding in the project is managed by providing tokens through the distributed ledger, for example.

Servers 10B and 10C are devices having the same functions as server 10A, and operate independent from server 10A. Note that the number of servers is not limited to three, and may be any number greater than one. Servers 10A and the like are communicatively connected to each other, and may be connected over network N.

Terminal 40 is a terminal device in the possession of the provider. The content provided by the provider is electronic data such as, for example, moving images, still images, music, software (including application software), or the like. The content provided by the provider is assumed to be content created by the provider, and although the following will describe such a case, the content is not limited thereto. When a project is successful, terminal 40 provides the content of the project to the applicant. Terminal 40 is, for example, a personal computer, a smartphone, a tablet, or the like.

Terminal 41 is a terminal device in the possession of a solicitor of a crowdfunding project. The solicitor solicits funding from applicants so that the total amount of funding applications from applicants reaches a target amount of the project. Note that the solicitor may be the same party as the provider or the same party as the applicant, and the provider and solicitor may be different parties as well. When funding is solicited, terminal 41 generates transaction data including information pertaining to the solicitation of funding (also called "solicitation transaction data") and sends the generated solicitation transaction data to servers 10A and the like.

Terminal 50 is a terminal device in the possession of an applicant. The applicant refers to information pertaining to the solicitation of funding and provides funds. If the project is then successful, the provided funds are passed to the provider. On the other hand, if the project fails, the provided funds are returned to the applicant.

When providing funds, terminal 50 generates transaction data for payment of the funds (payment transaction data) and sends the generated payment transaction data to server 10A. Once a project is successful, terminal 50 obtains the content provided by the provider. The applicant can then use the content.

Terminal 51 is a terminal device in the possession of a funding applicant different from the applicant who possesses terminal 50. Terminal 51 is a device having the same functions as terminal 50, and operates independent from terminal 50. Note that the number of terminals in the possession of applicants is not limited to two. Rather, the same number of terminals as there are applicants are present.

The configurations of servers 10A and the like included in fund management system 1 will be described hereinafter in detail.

Figures 2, 3:
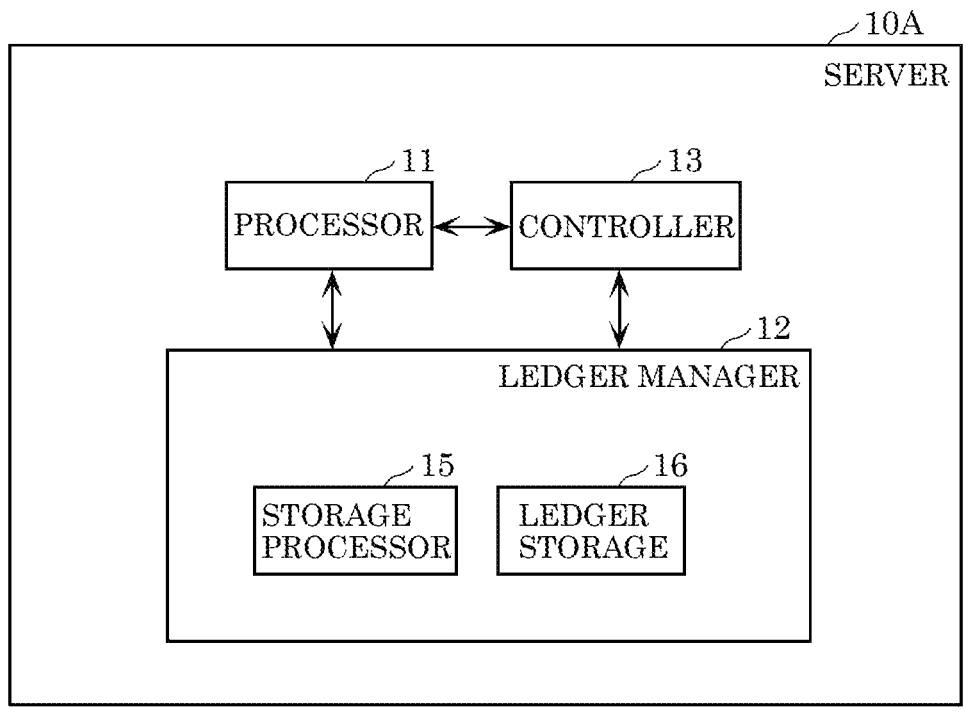
FIG. 2 is a block diagram schematically illustrating the configuration of a server according to Embodiment 1.
FIG. 3 is a diagram schematically illustrating solicitation transaction data according to Embodiment 1.

FIG. 2 is a block diagram schematically illustrating the configuration of server 10A according to the present embodiment.

As illustrated in FIG. 2, server 10A includes processor 11, ledger manager 12, and controller 13. These functions of server 10A can be realized by, for example, a CPU executing programs using memory.

Processor 11 is a processor that manages various types of information using a distributed ledger. When transaction data is received from a device in fund management system 1, or when transaction data generated by controller 13 is obtained, processor 11 stores the received or obtained transaction data in the distributed ledger by providing that data to ledger manager 12. The transaction data includes solicitation transaction data, payment transaction data, and reimbursement transaction data. These types of transaction data will be described in detail later.

Ledger manager 12 is a processor that manages the distributed ledger. Ledger manager 12 stores the transaction data provided by processor 11 in the distributed ledger. Transaction data from the past to the present is stored in the distributed ledger. Distributed ledgers have a characteristic in that it is difficult to tamper with information recorded in the distributed ledger, and the transaction data s managed based on this characteristic, so as not to be tampered with.

Ledger manager 12 includes storage processor 15 and ledger storage 16.

Storage processor 15 is a processor that stores, in ledger storage 16, new transaction data to be stored in the distributed ledger. Storage processor 15 stores the new transaction data in ledger storage 16 in a format based on the type of the distributed ledger. Storage processor 15 also exchanges communication data with storage processor 15 of another server among servers 10A and the like, and causes the new transaction data to be stored in ledger storage 16 of the other server as well. For example, when the distributed ledger is a blockchain, storage processor 15 generates a block containing the new transaction data and stores the block in ledger storage 16 having synchronized the generated block with servers 10A and the like.

Ledger storage 16 is a storage device that stores the distributed ledger. The distributed ledger stored in ledger storage 16 stores one or more instances of the transaction data, and is managed using properties such as hash values so that it is difficult to tamper with the distributed ledger (this will be described later).

Although a case where the distributed ledger is a blockchain is described here as an example, other types of distributed ledgers (e.g., IOTA, hash graph, or the like) can also be used. Note also that the distributed ledger may or may not execute a consensus algorithm (e.g., Practical Byzantine Fault Tolerance (PBFT), Proof of Work (PoW) or Proof of Stake (PoS)) when storing new data. An example of distributed ledger technology that does not execute a consensus algorithm is Hyperledger fabric.

Controller 13 is a processor that determines whether or not the crowdfunding project is successful, and controls the provision of funds. Controller 13 receives a target condition of the crowdfunding from terminal 41 through a solicitation transaction. Controller 13 also accepts the payment of tokens to a management account through payment transactions from terminals 50 and 51. Controller 13 determines whether or not the target condition of the crowdfunding has been met, and outputs information indicating a result of the determination. Here, the "management account" is an account used in crowdfunding for managing tokens by temporarily storing the tokens.

Controller 13 controls processing involved in the crowdfunding based on the result of the determination. Specifically, controller 13 processes various types of notifications and the like made when a crowdfunding project has succeeded. Controller 13 also performs control so that when a project has failed, reimbursement processing, in which the tokens paid by applicants to the management account are returned to the applicants from the management account, is performed.

Note that the determination as to whether or not the target condition has been met may be made a plurality of times.

For example, the determination as to whether or not the target condition has been met is made by determining whether or not the total tokens paid through payment processing of the transaction data received during the solicitation period is at least the target amount of the crowdfunding at the point in time when the crowdfunding solicitation period ends. The present embodiment will describe such a case as an example.

Note that the "payment processing" is processing through which each of one or more applicants pays a predetermined amount of tokens. The payment transaction data used in the payment processing includes the predetermined amount of tokens which each of the one or more applicants is to pay.

Note that some or all of the above-described processing by controller 13 can be performed through a smart contract realized by executing contract code stored in ledger storage 16, but the processing is not limited thereto. The following will describe a case where all of the above-described processing by controller 13 is performed through a smart contract as an example.

The various types of transaction data will be described hereinafter.

FIG. 3 is a diagram schematically illustrating the solicitation transaction data according to the present embodiment. The solicitation transaction data is generated by solicitor U2, i.e., terminal 41, at the start of the crowdfunding project, and is transmitted to servers 10A and the like.

As illustrated in FIG. 3, the solicitation transaction data includes a solicitor ID, a project ID, a management account ID, a provider account ID, a solicitation period, a target amount, a payment amount, a contract code, and the signature.

The solicitor ID is an identifier capable of uniquely identifying the solicitor who is soliciting finding for the project.

The project ID is an identifier capable of uniquely identifying the project.

The management account ID is an identifier capable of uniquely identifying the management account of the crowdfunding.

The provider account ID is an identifier capable of uniquely identifying an account of the provider.

The solicitation period is information indicating a solicitation period of the project, i.e., the end of the solicitation period.

The target amount is information indicating an amount of funding which the solicitor is aiming to reach in the project, i.e., an amount of tokens.

The payment amount is information indicating the amount of tokens to be paid by each applicant in the project.

The contract code is a code of the smart contract which determines whether or not the project is successful.

The signature is an electronic signature added by a device or person which generated the solicitation transaction data.

The solicitation transaction data illustrated in FIG. 3 is used when a solicitor having a solicitor ID of "aaa001" solicits funding for a project having a project ID of "kdfjafjpo34". In this project, the management account ID is "moaq68079", the provider account ID of the provider is "fljad4019", the solicitation period is "2018.10.10 15:00:00", the target amount is "100" tokens, and the payment amount is "1" token. The signature is the electronic signature of the solicitor.

Note that the conditions indicated in FIG. 3, such as the solicitation period, the target amount, and the payment amount, may be denoted in the contract code. Additionally, although the specific content of the contract code is not shown in FIG. 3, the processing details thereof will be described in detail later.

FIG. 4 is a diagram schematically illustrating the payment transaction data according to the present embodiment. The payment transaction data is generated when funds are paid in the project, by the applicant making the payment (e.g., applicant U3, i.e., terminal 50), and is sent to servers 10A and the like.

As illustrated in FIG. 4, the payment transaction data includes an applicant account ID, a project ID, a management account ID, a payment amount, a sending date/time, and a signature.

The applicant account ID is an identifier capable of uniquely identifying an account of the applicant who pays funds.

The project ID is an identifier capable of uniquely identifying the project.

The management account ID is an identifier capable of uniquely identifying the management account of the crowdfunding.

The payment amount is information indicating the amount of tokens the applicant pays to the management account in the payment.

The sending date/time is information indicating the date/time at which the payment transaction data is sent.

The signature is an electronic signature added by a device or person which generated the payment transaction data.

The payment transaction data illustrated in FIG. 4 is used when an applicant having an applicant account ID of "aab0aab" pays funds for the project having a project ID of "kdfjafjpo34". In this payment, the payment amount is "1" token and the sending date/time of the payment transaction data is "2018.10.11 07:00:00". The signature is the electronic signature of the applicant.

Note that the payment transaction data illustrated in FIG. 4 can also be said to have a data structure used in a fund management system including a plurality of servers that hold a distributed ledger, where the data structure includes: identification information that can uniquely identify a project of crowdfunding; an identifier of an account of an applicant who pays a token in the project; an identifier of a management account that receives payment of the token in the project; information indicating an amount of tokens paid by the applicant in the project; and an electronic signature of the applicant.

FIG. 5 is a diagram schematically illustrating the reimbursement transaction data according to the present embodiment. The reimbursement transaction data is generated by servers 10A and the like when funds are returned to an applicant from the management account in the event that a project has not succeeded.

As illustrated in FIG. 5, the reimbursement transaction data includes an applicant account ID, a project ID, a management account ID, a reimbursement amount, a sending date/time, and a signature.

The applicant account ID is an identifier capable of uniquely identifying an account of the applicant who will be reimbursed with funds.

The project ID is an identifier capable of uniquely identifying the project.

The management account ID is an identifier capable of uniquely identifying the management account of the crowdfunding.

The reimbursement amount is information indicating an amount of tokens to be returned from the management account to the applicant account in the reimbursement.

The sending date/time is information indicating the date/time at which the reimbursement transaction data is sent.

The signature is an electronic signature added by a device or person which generated the reimbursement transaction data.

The reimbursement transaction data illustrated in FIG. 5 is used when an applicant having an applicant account ID of "aab0aab" receives a reimbursement of funds for the project having a project ID of "kdfjafjpo34". In this reimbursement, the reimbursement amount is "1" token, the sending date/time of the reimbursement transaction data is "2018.10.31 00:00:00", and an electronic signature of server 10A is the signature.

Processing by servers 10A and the like configured as described above will be described next.

Figure 6:
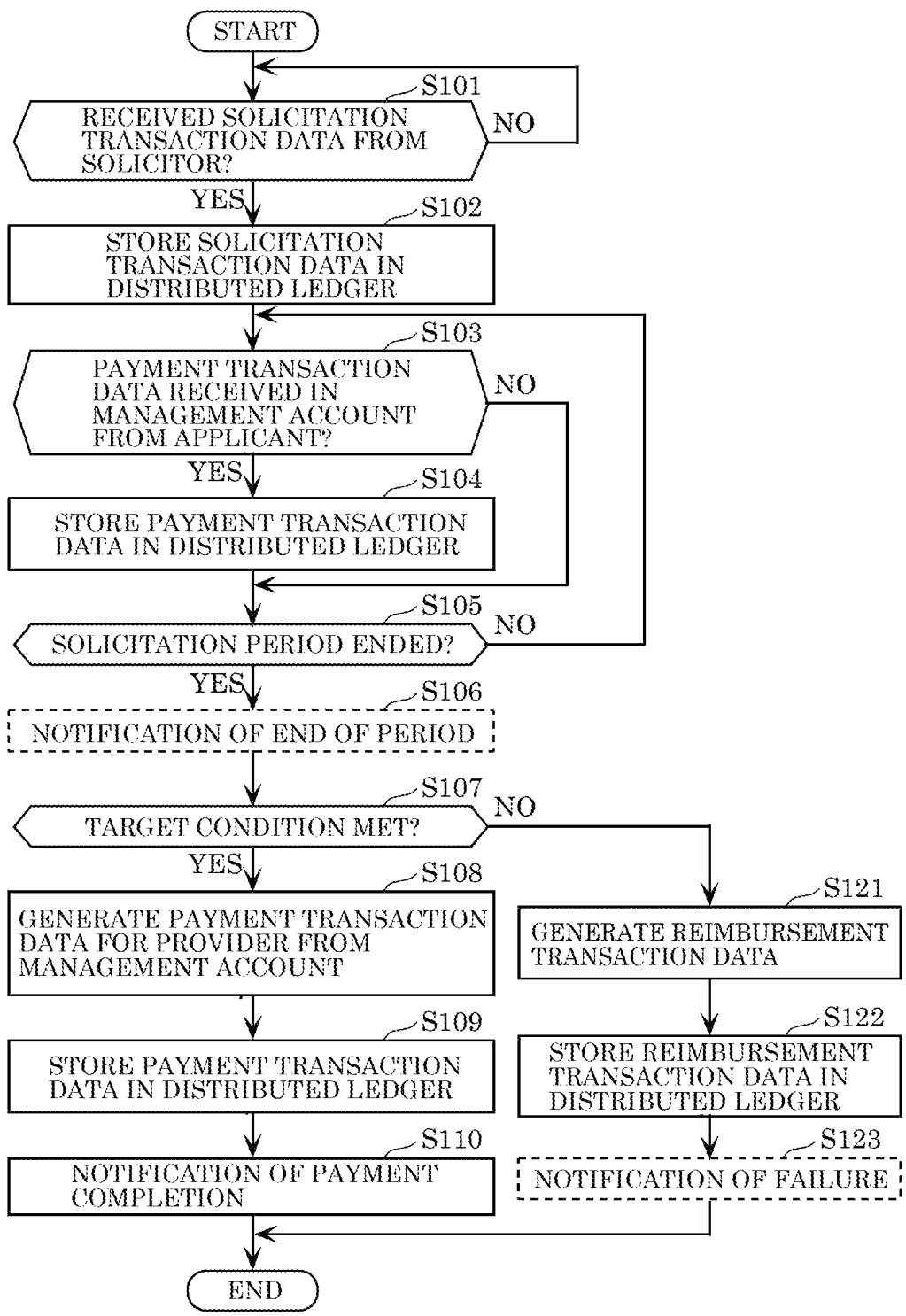
FIG. 6 is a flowchart illustrating processing performed by the server according to Embodiment 1.

FIG. 6 is a flowchart illustrating processing performed by server 10A according to the present embodiment.

In step S101, processor 11 determines whether or not the solicitation transaction data has been received from solicitor U2, i.e., from terminal 41. If the solicitation transaction data has been received (Yes in step S101), the sequence moves to step S102, and if not (No in step S101), step S101 is executed again. In other words, processor 11 stands by in step S101 until the solicitation transaction data is received. Note that the solicitation transaction data includes the contract code of the smart contract for determining the target condition of the project.

In step S102, processor 11 stores the solicitation transaction data received in step S101 in the distributed ledger by providing that data to ledger manager 12. Processor 11 also sends the solicitation transaction data to the other server 10B and the like to cause the data to be stored in the distributed ledger of all servers 10A and the like, In step S103, processor 11 determines whether or not the payment transaction data has been received from applicant U3, i.e., from terminal 41. If the payment transaction data has been received (Yes in step S103), the sequence moves to step S104, and if not (No in step S103), the sequence moves to step S105.

In step S104, processor 11 stores the payment transaction data received in step S108 in the distributed ledger by providing that data to ledger manager 12. Processor 11 also sends the payment transaction data to the other server 10B and the like to cause the data to be stored in the distributed ledger of all servers 10A and the like.

In step S105, controller 13 determines whether or not the solicitation period has ended. Whether or not the solicitation period has ended is determined, for example, based on the payment transaction data stored in step S104. If it is determined that the solicitation period has ended (Yes in step S105), the sequence moves to step S106, and if not (No in step S105), the sequence moves to step S103.

In step S106, controller 13 notifies terminal 50 and the like of applicant U3 and the like that the solicitation period has ended. Note, however, that step S106 need not be performed.

In step S107, controller 13 determines whether or not the target condition of the crowdfunding project has been met. The determination as to whether or not the target condition has been met is made by executing the contract code included in the solicitation transaction data received in step S101. If it is determined that the target condition has been met (Yes in step S107), the sequence moves to step S108, and if not (No in step S107), the sequence moves to step S121.

In step S108, controller 13 generates the payment transaction data.

In step S109, controller 13 stores the payment transaction data generated in step S108 in the distributed ledger by providing that data to ledger manager 12. Controller 13 also sends the payment transaction data to the other server 10B and the like to cause the data to be stored in the distributed ledger of all servers 10A and the like.

In step S110, controller 13 sends a notification that payment is complete to provider U1, i.e., terminal 40. Upon receiving the notification, terminal 40 performs control so that the content generated by provider U1 is provided to the applicant.

In step S121, controller 13 generates the reimbursement transaction data. The reimbursement transaction data generated by controller 13 is transaction data indicating that funds are to be returned to the applicant from the management account.

In step S122, controller 13 stores the reimbursement transaction data generated in step S121 in the distributed ledger by providing that data to ledger manager 12. Controller 13 also sends the reimbursement transaction data to the other server 10B and the like to cause the data to be stored in the distributed ledger of all servers 10A and the like.

In step S123, controller 13 notifies applicant U3, i.e., terminal 50, that the project has failed. Note, however, that step S121 need not be performed.

The sequence of processing illustrated in FIG. 6 ends after step S110 or step S123.

Processing performed by fund management system 1 as a whole will be described next.

Figure 7:
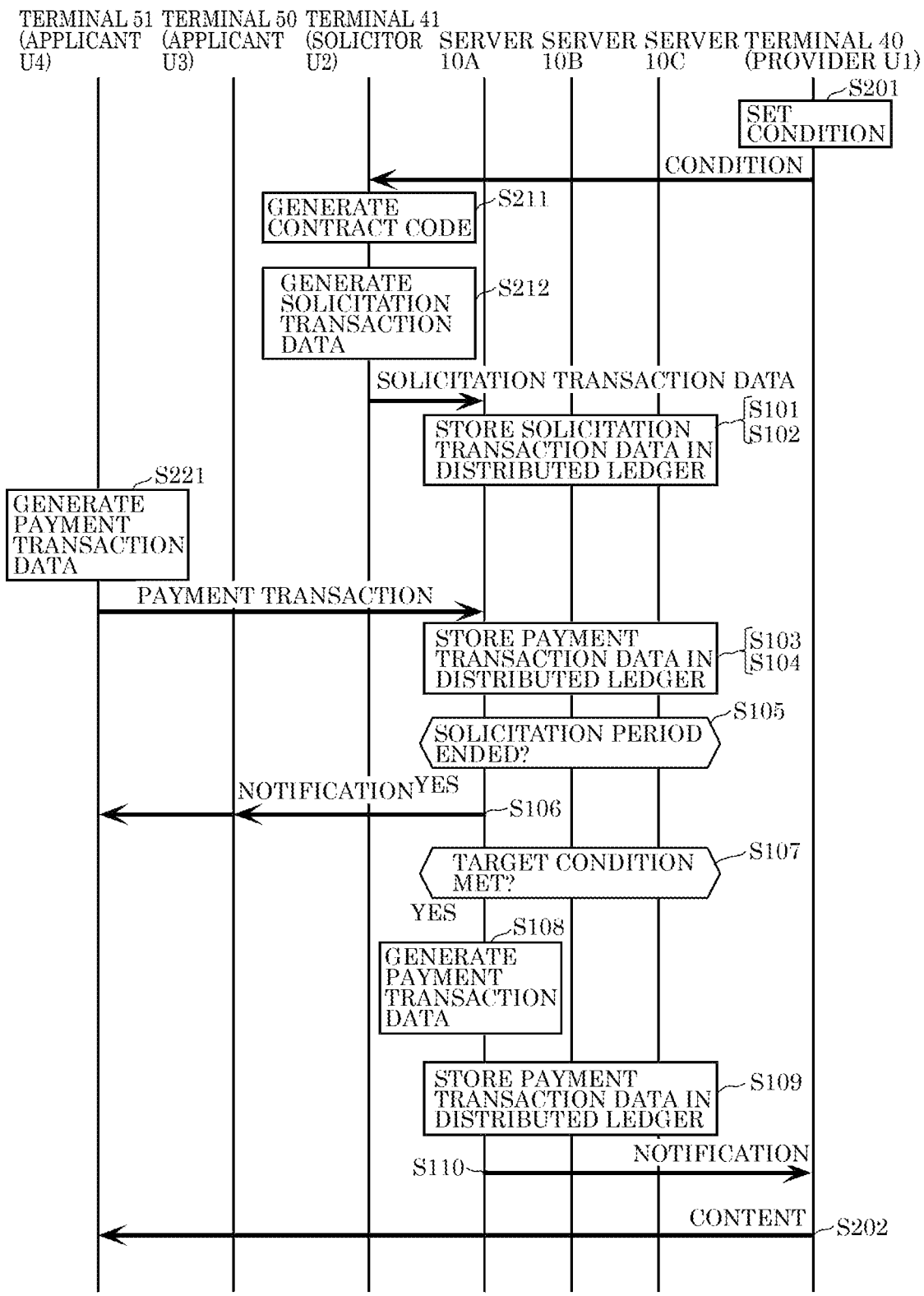
FIG. 7 is a first sequence chart illustrating overall processing performed by the fund management system according to Embodiment 1.

FIG. 7 is a first sequence chart illustrating overall processing performed by fund management system 1 according to the present embodiment. FIG. 7 illustrates overall processing performed by fund management system 1 when a project has succeeded. Note that processing that is the same as that in the flowchart of FIG. 6 will be given the same reference signs as in FIG. 6, and will not be described.

In step S201, terminal 40 of provider U1 sets conditions pertaining to the crowdfunding project and sends the set conditions to terminal 41. The stated conditions include the solicitation period, the target amount, and the payment amount. Terminal 41 receives the conditions which have been sent.

In step S211, based on the conditions received in step S201, terminal 41 generates a contract code for determining the target condition of the project.

In step S212, terminal 41 generates solicitation transaction data (see FIG. 3) that includes the conditions received in step S201 and the contract code generated in step S211. Additionally, terminal 41 sends the generated solicitation transaction data to servers 10A and the like. At this time, terminal 41 may send the generated solicitation transaction data to one of servers 10A and the like, or to a plurality of the servers.

Servers 10A and the like receive the solicitation transaction data sent from terminal 41, and store that data in the distributed ledger (steps S101 and S102).

In step S221, terminal 51 generates the payment transaction data and sends that data to servers 10A and the like. At this time, terminal 51 may send the generated payment transaction data to one of servers 10A and the like, or to a plurality of the servers.

Servers 10A and the like receive the payment transaction data which has been sent, and store that data in the distributed ledger (steps S103 and S104). If the solicitation period has ended, a notification that the solicitation period has ended is also sent (steps S105 and S106).

Then, if the target condition has been met, servers 10A and the like generate payment transaction data pertaining to the payment of funds from the management account to the provider, and store that data in the distributed ledger (steps S108 and S109). A notification that the payment is complete is then sent to terminal 40 (step S110).

Upon receiving the notification, in step S202, terminal 40 provides the content generated by the provider to the applicant.

Note that the provision of the content from the provider to the applicant in step S202 may be performed at any time as long as that time is after the determination that the target condition has been met (step S107).

Additionally, the generation of the payment transaction in step S108 may be performed by server 10B or the like, terminal 41 or the like, and so on, instead of server 10A.

Figure 8:
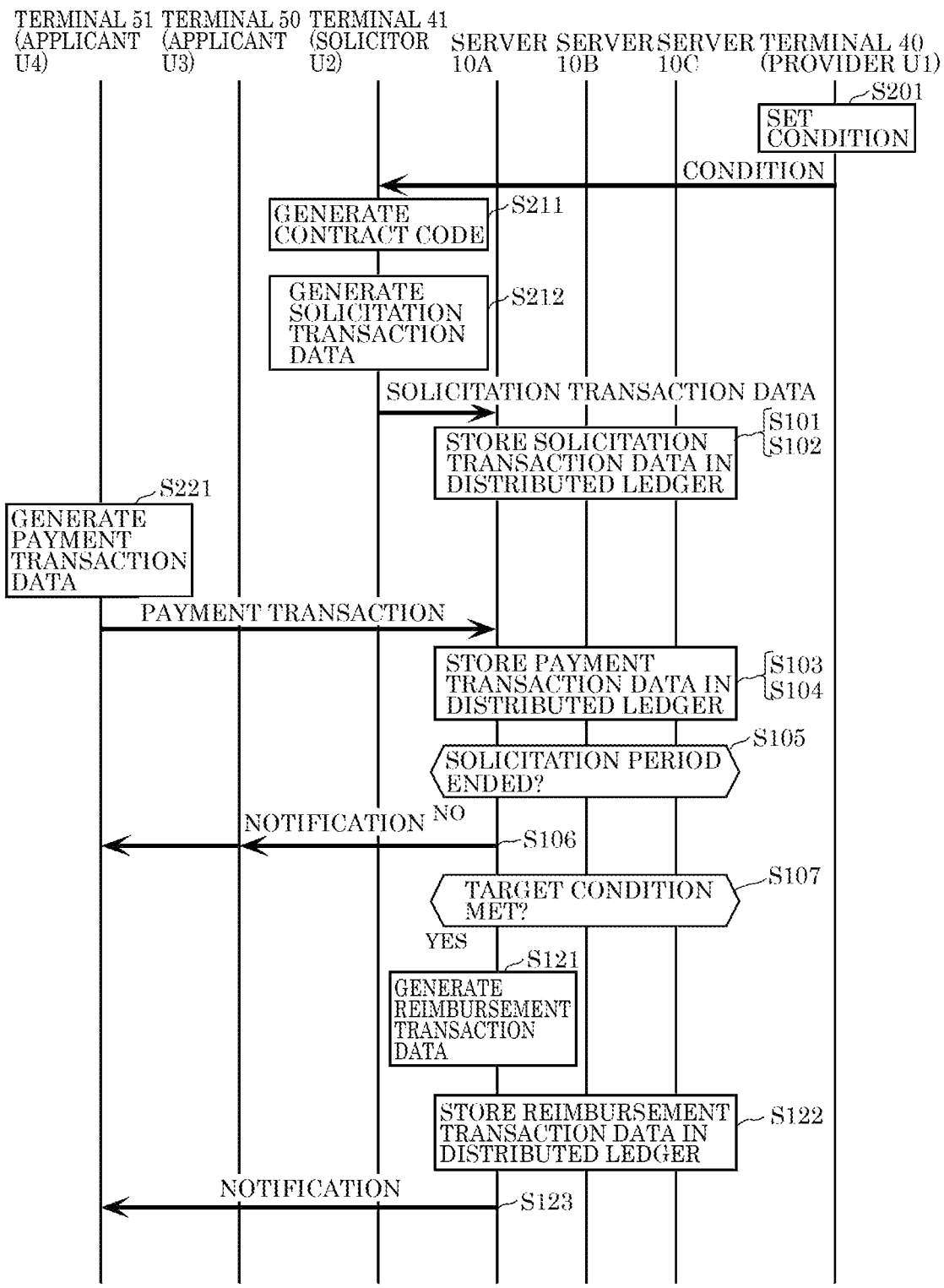
FIG. 8 is a second sequence chart illustrating overall processing performed by the fund management system according to Embodiment 1.

FIG. 8 is a second sequence chart illustrating overall processing performed by fund management system 1 according to the present embodiment. FIG. 8 illustrates overall processing performed by fund management system 1 when a project has failed.

In FIG. 8, the processing from step S201 to step S107 is the same as the processing in FIG. 7, but the result of the determination made in step S107, and the processing that follows thereafter, are different from the details illustrated in FIG. 7.

In step S107, if the target condition has not been met, servers 10A and the like generate reimbursement transaction data pertaining to the return of funds from the management account to the applicant, and store that data in the distributed ledger (steps S121 and S122). A notification that the project has failed is then transmitted to terminal 40 (step S123).

Although the above describes a case where a single applicant pays a single token as an example, it should be noted that a single applicant may pay two or more tokens as well. In such a case, the number of applicants being at least a predetermined number may be added as a target condition, in addition to the total amount of funding applications by applicants reaching the target amount of the project. This is done to provide the content to a greater number of people.

Additionally, a snapshot or preview image of the content may be provided to applicants before making applications in order to prevent providers from providing malicious content (e.g., fake content).

Additionally, a reward may be provided to parties who apply earlier in the solicitation period. Here, the "reward" may be tokens; a greater percentage of profit from the content created by the provider, if the content subsequently generates a profit; or providing the content more quickly.

Additionally, the solicitor may pay tokens to the provider.

Although the configuration of fund management system 1 has been described using a case in which servers 10A and the like, terminal 40, and so on are independent devices as illustrated in FIG. 1, the configuration is not limited thereto. For example, the configuration may be such that server 10A is omitted, and terminals 40, 41, 50, and 51 hold the distributed ledger. Additionally, the configuration may be such that terminal 50 or 51 holds the distributed ledger. In other words, some or all of terminals 40, 41, 50, and 51 may also function in the same manner as server 10A and the like.

Through the sequence of processing described above, the crowdfunding conditions and the information pertaining to the payment and reimbursement of tokens are both stored as transaction data in the distributed ledger, which suppresses tampering with that information. Tampering with the information pertaining to the token payment processing in particular is suppressed, which prevents unauthorized cancellations from occurring after an applicant has paid. Accordingly, fund management system 1 can appropriately manage fundraising performed in crowdfunding.

Embodiment 2

The present embodiment will describe a fund management system that appropriately manages fundraising in crowdfunding, a control method for such a system, and the like, using a different example from that described in Embodiment 1.

The configuration of fund management system 1, the configuration of the servers, and the structures of the various types of transaction data are the same in the present embodiment as in Embodiment 1 (see FIGS. 1 and 2).

In server 10A according to the present embodiment, the timing at which controller 13 determines whether or not the target condition of the crowdfunding has been met is different from that in Embodiment 1.

For example, the determination as to whether or not the target condition has been met is made by determining, when transaction data has been received, whether or not the total tokens paid through payment processing pertaining to transaction data received before the aforementioned transaction data was received is at least the target amount of the crowdfunding.

Processing performed by servers 10A and the like according to the present embodiment will be described hereinafter.

Figure 9:
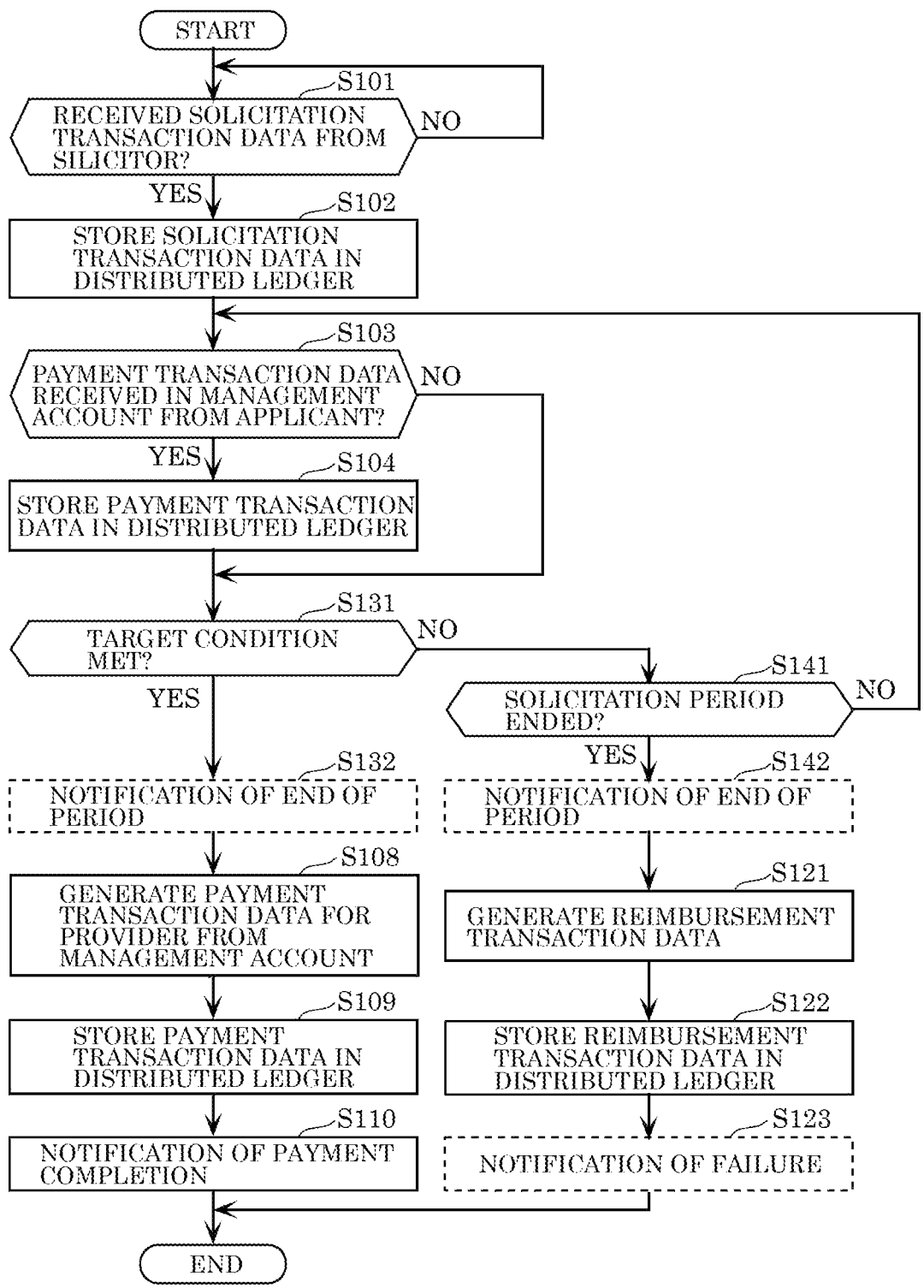
FIG. 9 is a flowchart illustrating processing performed by the server according to Embodiment 2.

FIG. 9 is a flowchart illustrating processing performed by server 10A according to the present embodiment. In this flowchart, processing that is the same as in Embodiment 1 will be given the same reference numerals, and will not be described in detail.

In steps S101 to S104, processor 11 receives the solicitation transaction data and the payment transaction data, and stores that data in the distributed ledger.

In step S131, controller 13 determines whether or not the target condition of the crowdfunding has been met. The determination as to whether or not the target condition has been met is made by executing the contract code included in the solicitation transaction data received in step S101. Whether or not the target condition has been met is determined, for example, based on the payment transaction data stored in step S104. If it is determined that the target condition has been met (Yes in step S131), the sequence moves to step S132, and if not (No in step S131), the sequence moves to step S141.

In step S132, processor 11 notifies terminal 50 and the like of applicant U3 and the like that the solicitation period has ended. Note, however, that step S132 need not be performed. Thereafter, processing pertaining to the payment of funds to the provider is performed by controller 13 (steps S108 to S110), after which the sequence of processing illustrated in FIG. 9 ends.

In step S141, controller 13 determines whether or not the solicitation period has ended. If it is determined that the solicitation period has ended (Yes in step S141), the sequence moves to step S142, and if not (No in step S141), the sequence moves to step S103.

In step S142, controller 13 notifies the terminal of the applicant that the solicitation period has ended. Note, however, that step S142 need not be performed. Thereafter, controller 13 executes processing pertaining to the return of funds to the applicant (steps S121 to S122). Additionally, controller 13 notifies applicant U3, i.e., terminal 50, that the project has failed (step S123), after which the sequence of processing illustrated in FIG. 9 ends.

Figure 10:
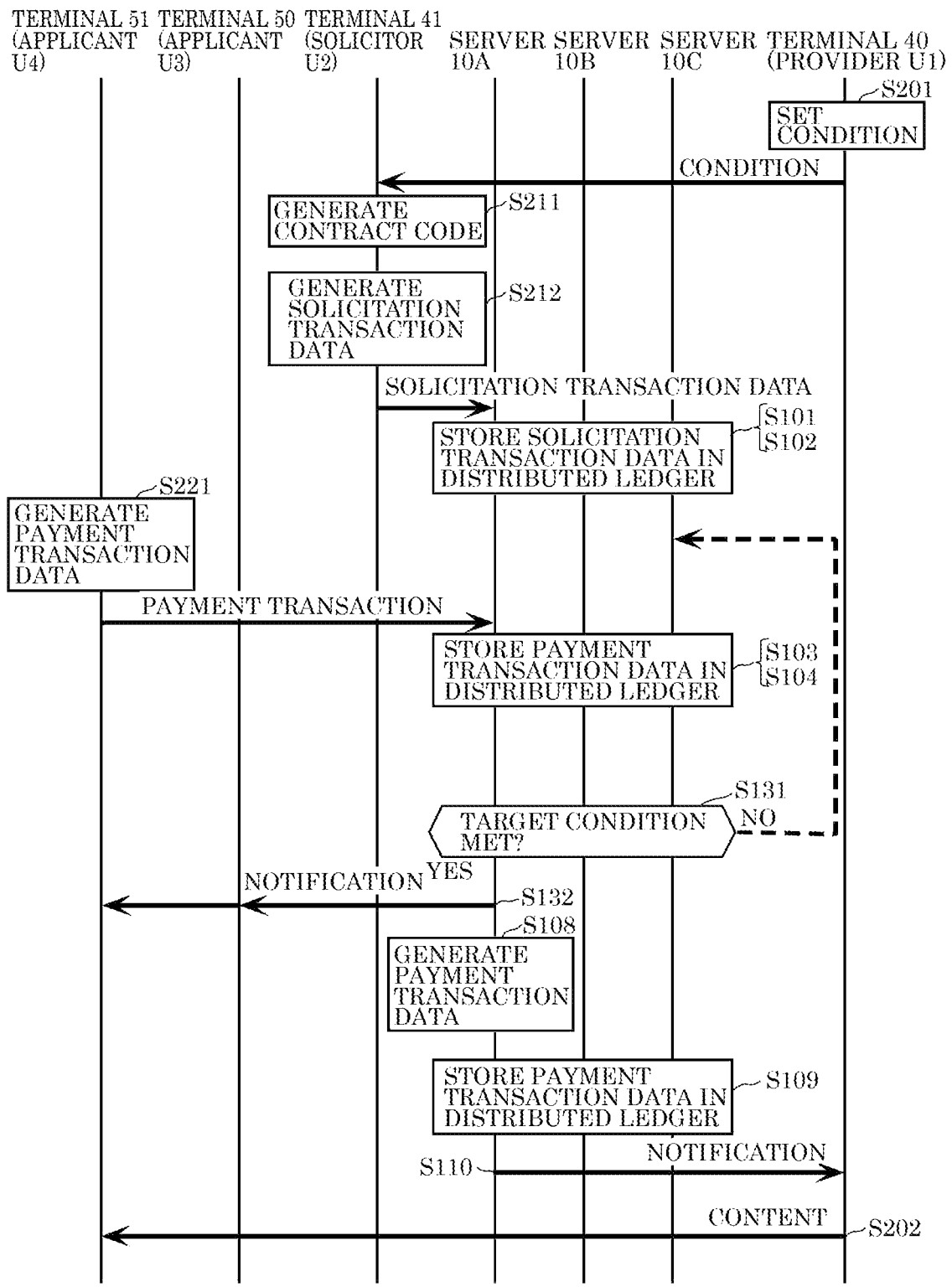
FIG. 10 is a first sequence chart illustrating overall processing performed by the fund management system according to Embodiment 2.

FIG. 10 is a first sequence chart illustrating overall processing performed by fund management system 1 according to the present embodiment. The sequence chart in FIG. 10 illustrates a case where the target condition has been met within the solicitation period.

The processing from steps S201 to S104 is the same as the processing in Embodiment 1 (see FIG. 7).

Controller 13 determines whether or not the target condition has been met each time payment transaction data is stored in the distributed ledger in step S104. If the target condition has not been met, controller 13 stands by until payment transaction data is received again. However, if the target condition has been met, terminal 50 and the like of applicant U3 and the like are notified.

Thereafter, the processing of steps S108 to S202 is executed in the same manner as in Embodiment 1.

Note that the generation of the payment transaction data in step S108 may be performed by server 10B or the like, terminal 41 or the like, and so on, instead of server 10A.

Figure 11:
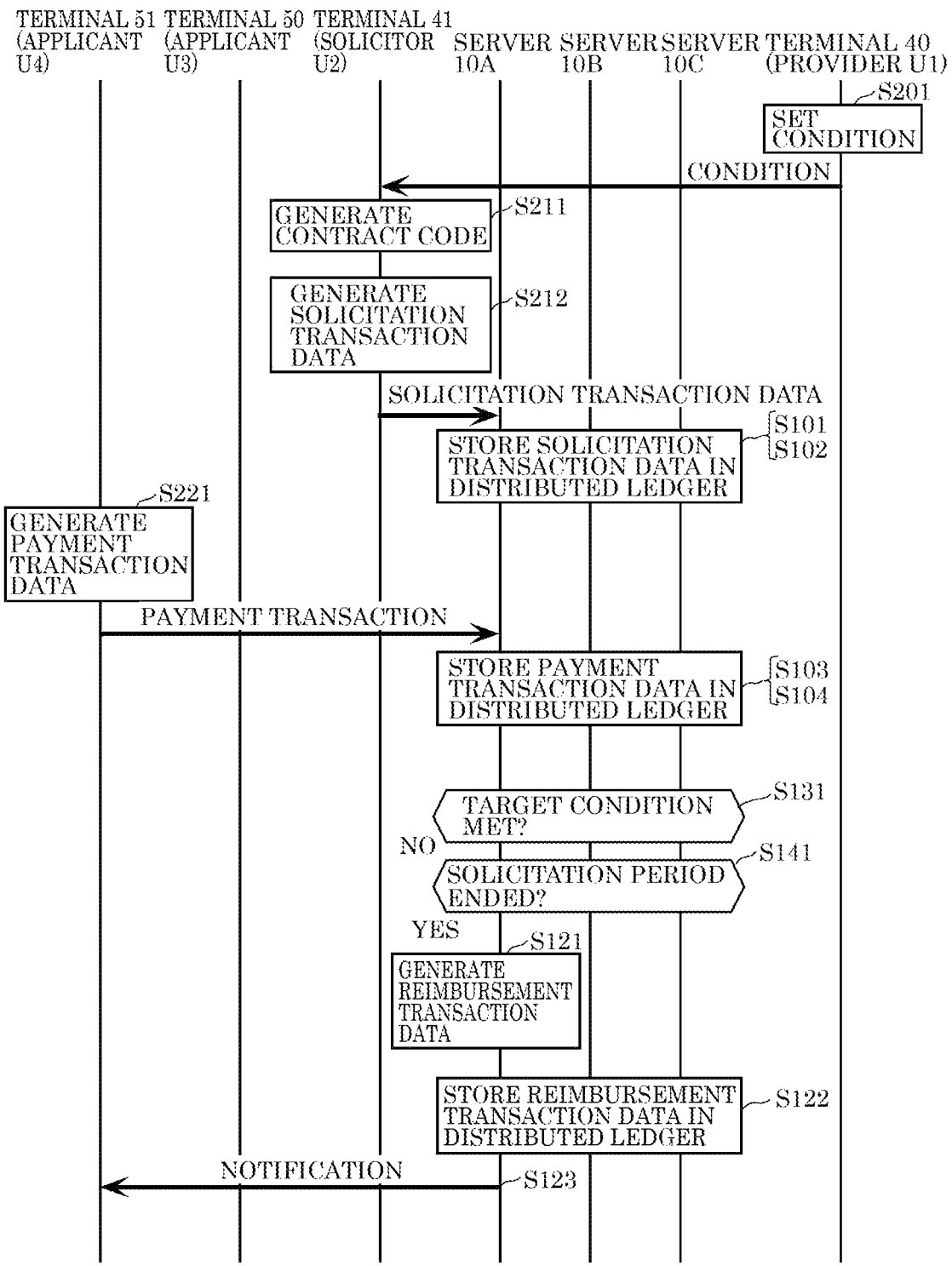
FIG. 11 is a second sequence chart illustrating overall processing performed by the fund management system according to Embodiment 2.

FIG. 11 is a second sequence chart illustrating overall processing performed by fund management system 1 according to the present embodiment. The sequence chart in FIG. 11 illustrates a case where the target condition has not been met within the solicitation period.

The processing from steps S201 to S104 is the same as the processing in Embodiment 1 (see FIG. 7).

Controller 13 determines whether or not the target condition has been met each time payment transaction data is stored in the distributed ledger in step S104. If the target condition has not been met and the solicitation period has ended, processing pertaining to returning the funds to the applicant is executed (steps S121 to S122), and a notification that the project has failed is made (step S123).

Note that the generation of the reimbursement transaction data in step S121 may be performed by server 10B or the like, terminal 41 or the like, and so on, instead of server 10A.

By operating in this manner, when the target condition has been met within the solicitation period, the solicitation ends and the payment processing is performed (see FIG. 10). Accordingly, the provider can receive payment without having to wait for the predetermined solicitation period to end.

On the other hand, if the target condition has not been met within the solicitation period, no payment is made to the provider, as in Embodiment 1 (see FIG. 11).

Embodiment 3

The present embodiment will describe a fund management system that appropriately manages fundraising in crowdfunding, a control method for such a system, and the like, using a different format from that described in Embodiments 1 and 2.

Specifically, in a crowdfunding project managed by the fund management system according to the present embodiment, it is assumed that at the beginning of the solicitation period, the target amount has been determined in advance, but the payment amount per applicant has not been determined. The fund management system includes reimbursement processing, in which after applicants have performed payment processing for a specified amount of tokens, each applicant is reimbursed with an amount of tokens obtained by subtracting, from the specified amount of tokens, an amount obtained by equally dividing the target amount among one or more applicants. Here, the "specified amount" is an amount of tokens specified by each applicant, and is a maximum amount of tokens the applicant is capable of paying. The fund management system according to the present embodiment manages projects in such a format.

In the project according to the present embodiment, when the payment amount per applicant is determined after the applicants have paid tokens, control is performed so that the payment amount for each applicant does not exceed the specified amount. Accordingly, it is not necessarily the case that all applicants who paid will ultimately pay funds. Of the applicants, an applicant who pays funds which are ultimately passed to the provider will also be called a "payer". Note also that the amount paid by an applicant through the payment processing will also be called a "paid-in amount".

For example, when, in the reimbursement processing, an amount of tokens obtained by equally dividing the target amount among the applicants exceeds the amount of tokens paid by one of the applicants in the payment processing, the target amount is equally divided among the applicants having first excluded the stated one applicant.

The solicitation transaction data and the payment transaction data used in the present embodiment will be described hereinafter.

Figure 12:
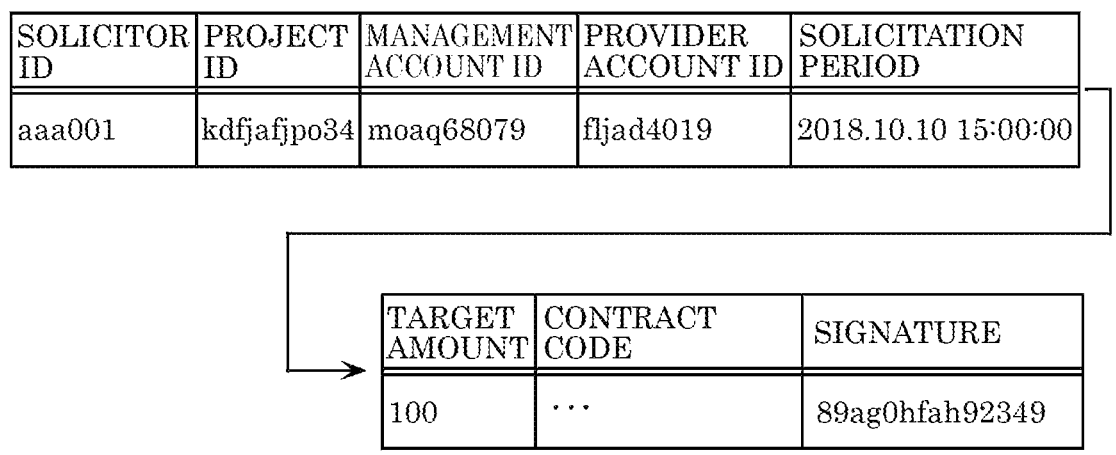
FIG. 12 is a diagram schematically illustrating solicitation transaction data according to Embodiment 3.

FIG. 12 is a diagram schematically illustrating the solicitation transaction data according to the present embodiment.

As illustrated in FIG. 12, the solicitation transaction data includes a solicitor ID, a project ID, a management account ID, a provider account ID, a solicitation period, a target amount, a contract code, and the signature.

The solicitation transaction data illustrated in FIG. 12 differs from the solicitation transaction data according to Embodiment 1 (see FIG. 3) in that the payment amount is not included. This is because the payment amount per applicant is not yet determined during the solicitation period.

The payment amount in the payment transaction data according to the present embodiment (not shown) is a maximum value for the amount of tokens which an applicant is capable of paying, specified by that applicant. The stated payment amount corresponds to the paid-in amount.

Figure 13:
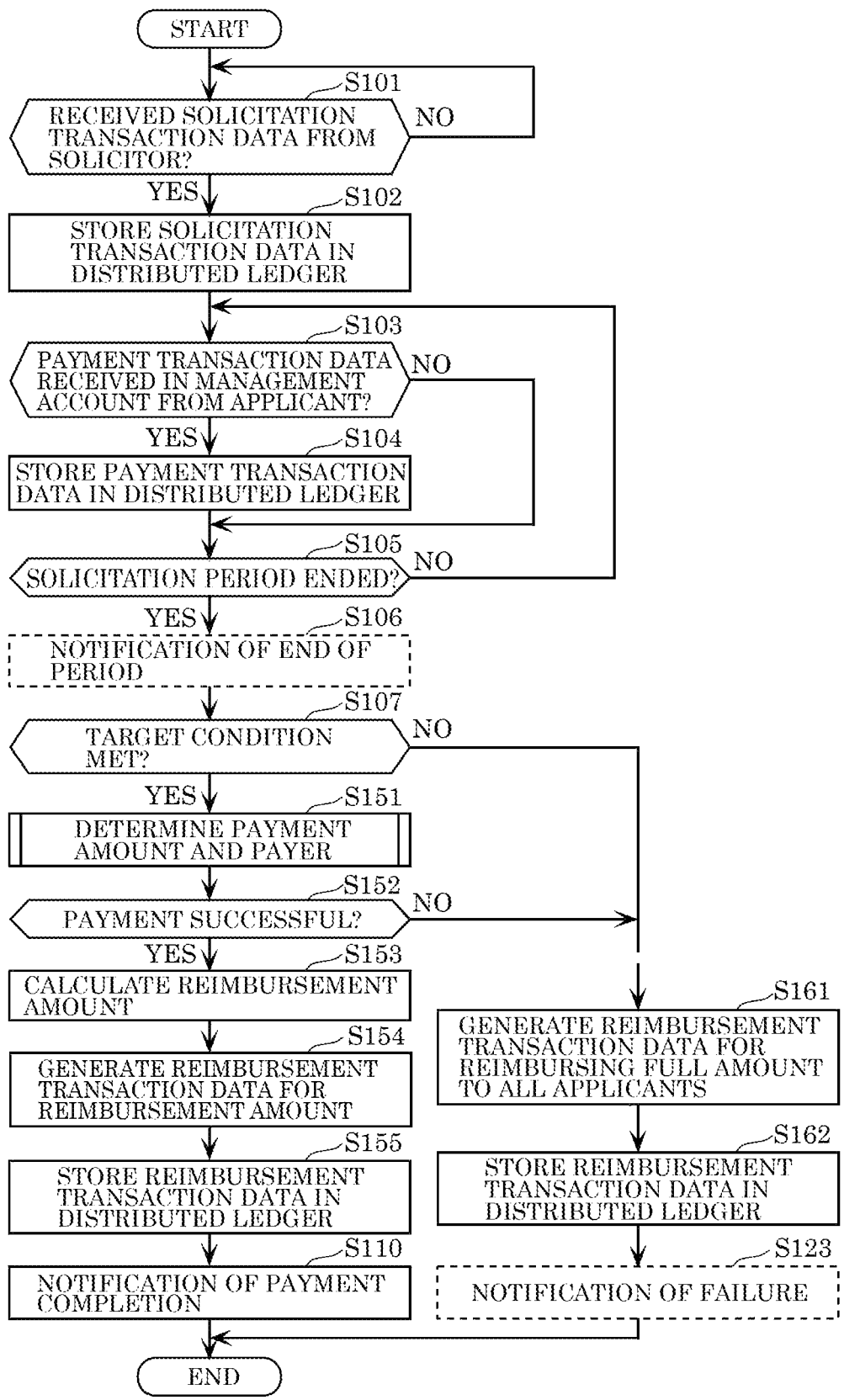
FIG. 13 is a flowchart illustrating processing performed by the server according to Embodiment 3.

FIG. 13 is a flowchart illustrating processing performed by server 10A according to the present embodiment.

The configuration of fund management system 1, the configuration of the servers, and the structures of the various types of transaction data are the same in the present embodiment as in Embodiment 1 (see FIGS. 1 and 2).

In server 10A according to the present embodiment, the processing through which controller 13 determines the payment amount and the like differ from Embodiment 1.

Processing performed by servers 10A and the like according to the present embodiment will be described hereinafter.

The processing from steps S101 to S107 is the same as that in Embodiment 1 (see FIG. 6).

In step S151, controller 13 determines the payment amount and the payer. Here, the payer is determined by a decision algorithm from among the applicants who sent the payment transaction data received in step S103. The decision algorithm for the payer and the payment amount can used a variety of methods, and one example will be described in detail later.

In step S152, controller 13 determines whether or not the payment has succeeded. Whether or not the payment has succeeded can be determined based on result information, indicating "payment has succeeded" or "payment has failed", which is obtained as a result of executing the decision algorithm for the payer and the payment amount in step S151. If it is determined that the payment has succeeded (Yes in step S152), the sequence moves to step S153, and if not (No in step S152), the sequence moves to step S161.

In step S153, controller 13 calculates a reimbursement amount. The "reimbursement amount" is an amount obtained by subtracting, from the paid-in amount, an amount of tokens obtained by equally dividing the target amount among one or more applicants.

In step S154, controller 13 generates a reimbursement transaction for returning the reimbursement amount calculated in step S153 to the applicant.

In step S155, controller 13 stores the reimbursement transaction data generated in step S154 in the distributed ledger by providing that data to ledger manager 12. Controller 13 also sends the reimbursement transaction data to the other server 10B and the like to cause the data to be stored in the distributed ledger of all servers 10A and the like. Then, like in Embodiment 1, controller 13 sends a notification that payment is complete to provider U1, i.e., terminal 40 (step S110).

In step S161, controller 13 generates a reimbursement transaction for returning the full amount of tokens paid through the payment transaction data received from each applicant in step S103, to the applicant.

In step S162, controller 13 stores the reimbursement transaction data generated in step S161 in the distributed ledger by providing that data to ledger manager 12. Controller 13 also sends the reimbursement transaction data to the other server 10B and the like to cause the data to be stored in the distributed ledger of all servers 10A and the like. Then, controller 13 may notify applicant U3, i.e., terminal 50, that the project has failed (step S123).

An example of the decision algorithm for the payer and the payment amount, used in the payment may by each applicant to the provider, will be described next.

Figure 14:
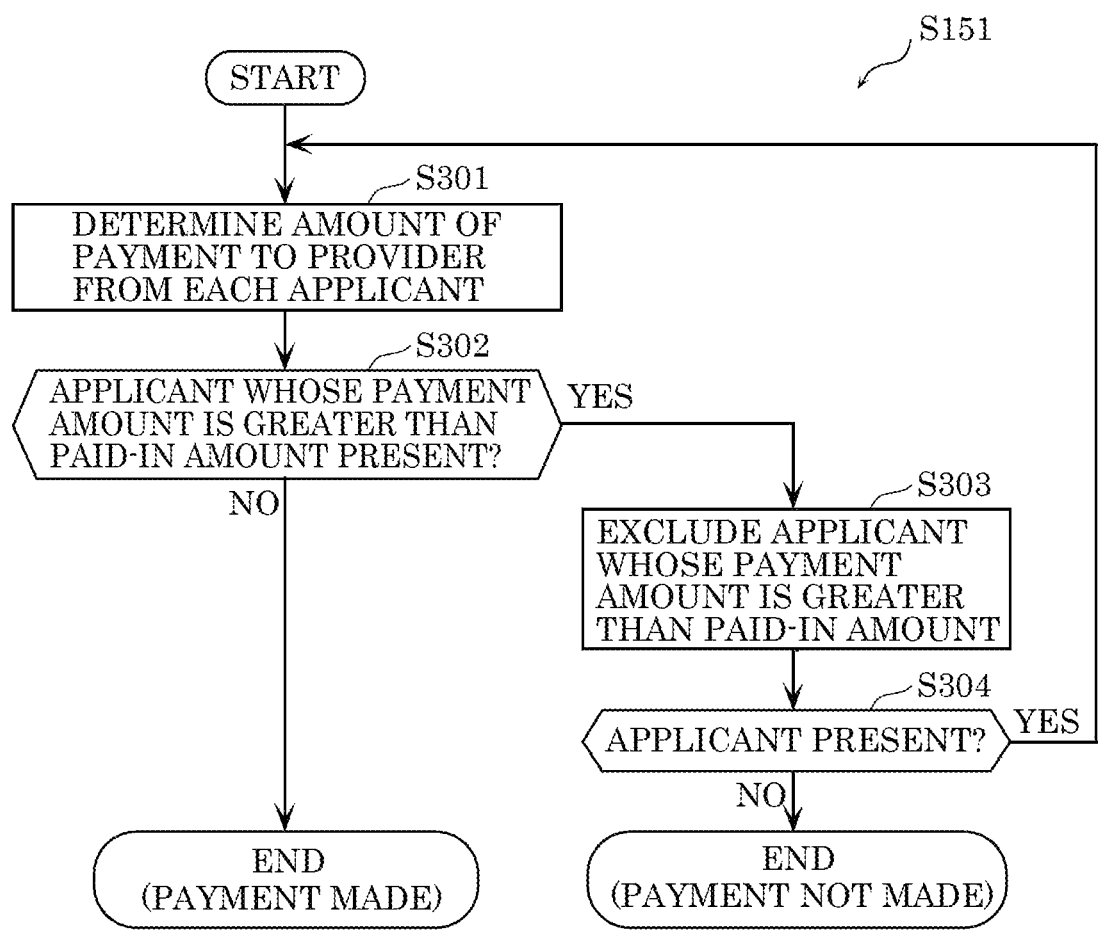
FIG. 14 is a flowchart illustrating an algorithm used by a controller to determine a payment amount, according to Embodiment 3.

FIG. 14 is a flowchart illustrating the decision algorithm used by controller 13 to determine the payment amount, according to the present embodiment. The flowchart in FIG. 14 is an example of processing included in step S151 of FIG. 13.

In step S301, controller 13 determines the payment amount for each applicant to the provider. For example, controller 13 determines the payment amount per applicant by equally dividing the target amount among the applicants.

In step S302, for each applicant, controller 13 compares the payment amount determined in step S301 with the paid-in amount of that applicant. Controller 13 then determines whether or not there is an applicant for which the payment amount exceeds the paid-in amount. If it is determined that there is an applicant for which the payment amount exceeds the paid-in amount (Yes in step S302), the sequence moves to step S303, and if not (No in step S302), the sequence of processing illustrated in FIG. 14 ends with information indicating a result of "payment has succeeded".

In step S303, controller 13 excludes the applicant for whom the payment amount exceeds the paid-in amount.

In step S304, controller 13 determines whether or not there is an applicant. In other words, it is determined whether or not one or more applicants is present after the exclusion processing performed in step S303. If it is determined that an applicant is present (Yes in step S304), the processing of step S301 is executed for the applicant remaining after the exclusion, and if not (No in step S304), the sequence of processing illustrated in FIG. 14 ends with information indicating a result of "payment has failed".

In this manner, controller 13 determines the payment amount of each applicant so that the payment amounts for all applicants become no greater than the paid-in amounts, while repeatedly excluding applicants, among the initial one or more applications, for whom the paid-in amount has been exceeded.

A specific example of the execution of the decision algorithm will be described next.

FIG. 15 is a diagram illustrating examples of paid-in amounts of applicants, according to the present embodiment.

FIG. 16 is a diagram illustrating an example of the progress of execution, and a result, of the decision algorithm used by controller 13 to determine the payment amount, according to the present embodiment.

Which applicants will ultimately make a payment when there are applicants A, B, C, D, E and F (also referred to as "applicants A to F") indicated in FIG. 15, along with the process of executing the decision algorithm, will be described here. Note that the paid-in amounts of applicants A to F are 10, 5, 20, 24, 100, and 60, as illustrated in FIG. 15. Furthermore, in the following descriptions, the first time the processing from steps S301 to S304 is executed will also be referred to as a "first turn", and the second time the stated processing is executed will also be referred to as a "second turn". The same applies for a third and subsequent turns.

As indicated in (1) of FIG. 16, in the first turn, the payment amount per applicant is calculated to be approximately 17 tokens in step S301. This value of 17 tokens exceeds the paid-in amounts of applicants A and B, and thus applicants A and B are excluded (step S303), resulting in state in which applicants C, D, E, and F are present.

Next, as indicated in (2) of FIG. 16, in the second turn, the payment amount per applicant is calculated to be 25 tokens in step S301. This value of 25 tokens exceeds the paid-in amounts of applicants C and D, and thus applicants C and D are excluded (step S303), resulting in state in which applicants E and F are present.

Next, as indicated in (3) of FIG. 16, in the third turn, the payment amount per applicant is calculated to be 50 tokens in step S301. This value of 50 tokens does not exceed the paid-in amounts of applicants E and F, and thus applicants E and F ultimately become the payers.

Figure 17:
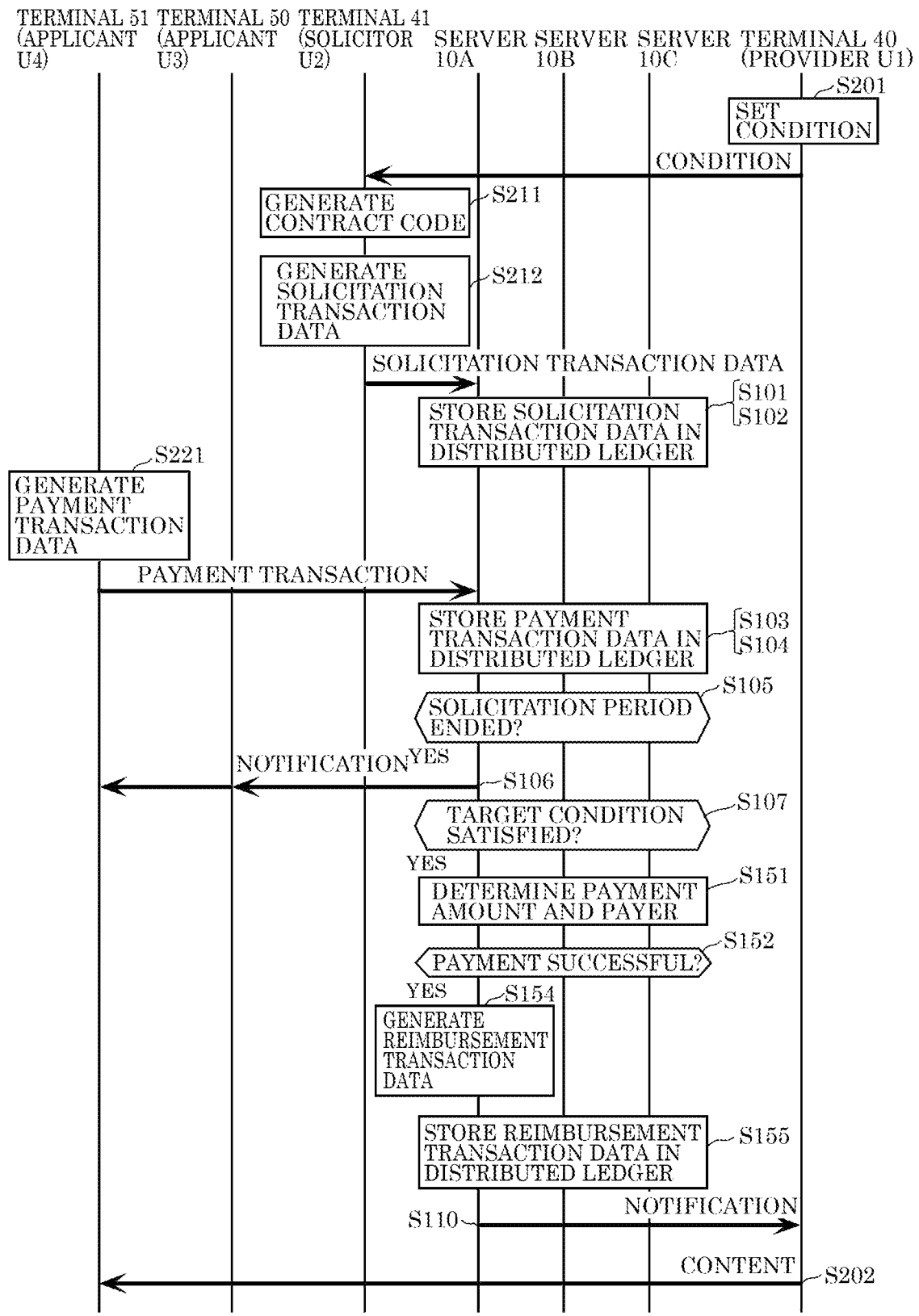
FIG. 17 is a first sequence chart illustrating overall processing performed by the fund management system according to Embodiment 8.

FIG. 17 is a first sequence chart illustrating overall processing performed by fund management system 1 according to the present embodiment. FIG. 17 illustrates overall processing performed by fund management system 1 when payment has succeeded.

The processing from steps S201 to S107 is the same as the processing in Embodiment 1 (see FIG. 7).

If the target condition has been met (Yes in step S107), controller 13 determines the payment amount and the payer, and if the payment is successful (steps S151 and S152), controller 13 calculates the reimbursement amount for each applicant and executes the reimbursement processing (steps S154 and S155). Thereafter, the processing of steps S110 to S202 is executed in the same manner as in Embodiment 1.

Note that the generation of the reimbursement transaction in step S154 may be performed by server 10B or the like, terminal 41 or the like, and so on, instead of server 10A.

Figure 18:
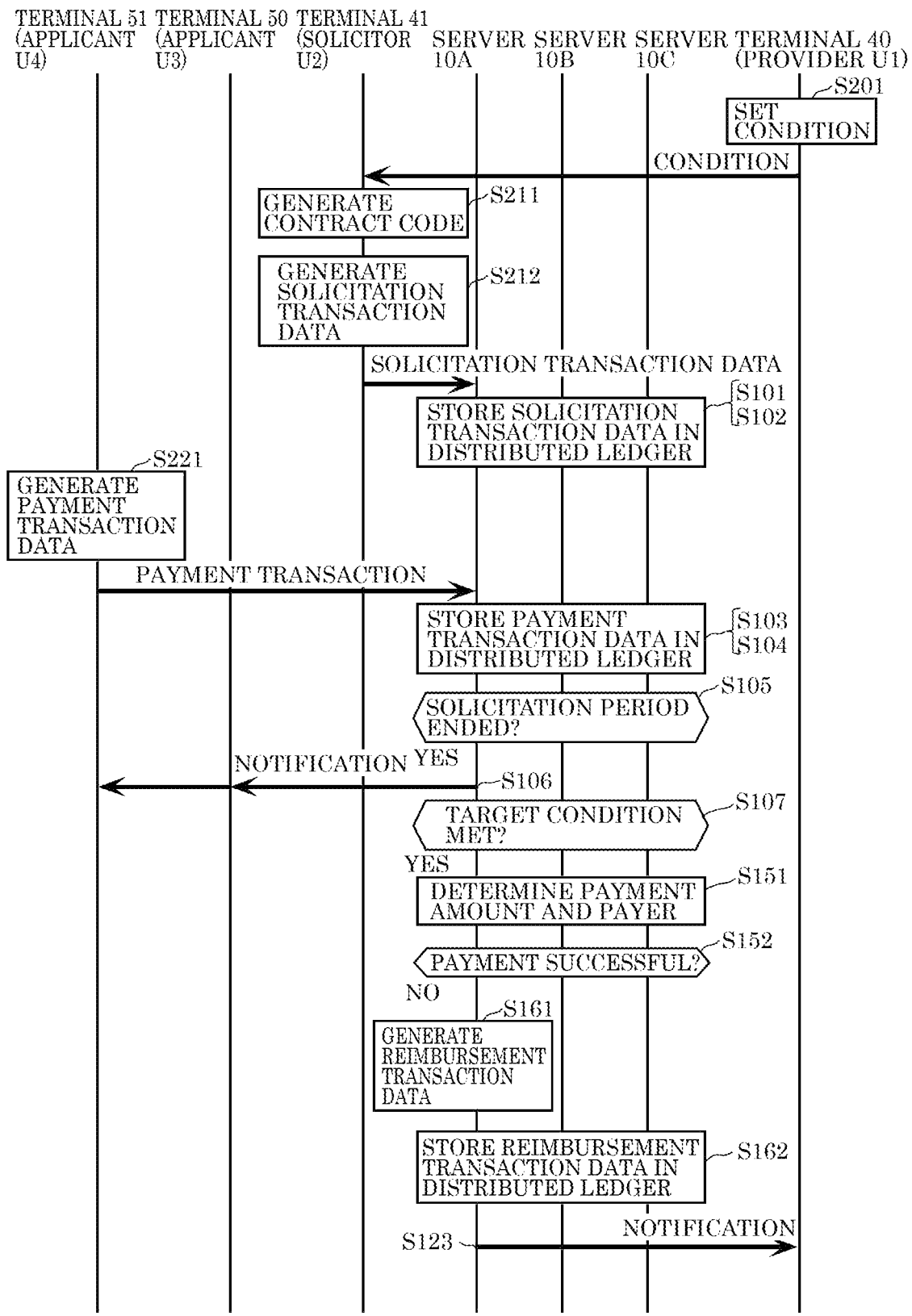
FIG. 18 is a second sequence chart illustrating overall processing performed by the fund management system according to Embodiment 8.

FIG. 18 is a second sequence chart illustrating overall processing performed by fund management system 1 according to the present embodiment. FIG. 18 illustrates overall processing performed by fund management system 1 when payment has failed.

The processing from steps S201 to S107 is the same as the processing in Embodiment 1 (see FIG. 7).

If the target condition has been met (Yes in step S107), controller 13 determines the payment amount and the payer, and if the payment fails (steps S151 and S152), controller 13 executes the reimbursement processing for returning the full amount to the applicant (steps S161 and S162). Then, controller 13 may notify applicant U3, i.e., terminal 50, that the project has failed (step S123).

Note that the generation of the reimbursement transaction in step S161 may be performed by server 10B or the like, terminal 41 or the like, and so on, instead of server 10A.

Variation on Embodiments

The control methods of the fund management system according to the foregoing embodiments can also be described as follows, but are not limited to the following descriptions.

Figure 19:
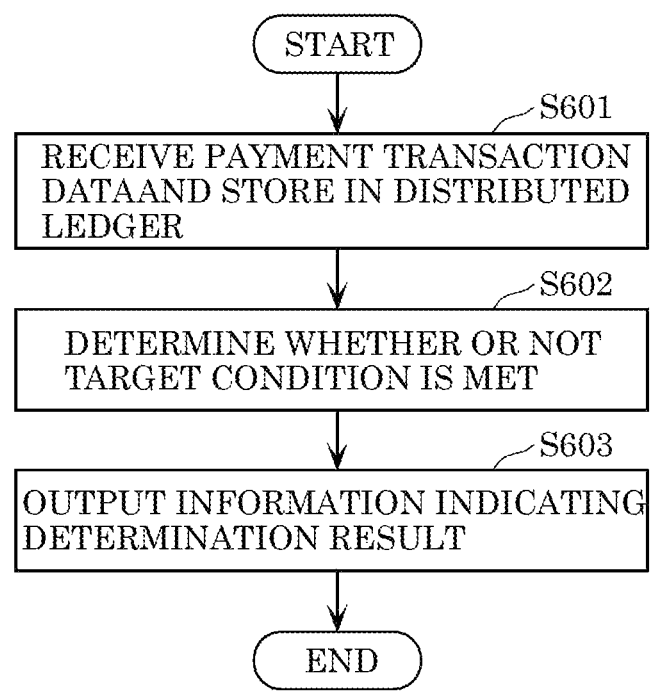
FIG. 19 is a flowchart illustrating processing performed by the server according to a variation on the embodiments.

FIG. 19 is a flowchart illustrating processing performed by a server according to a variation on the embodiments (also called a "control method of a server").

The sequence of processing illustrated in FIG. 19 is a control method of a fund management system including a plurality of servers that hold a distributed ledger, the control method being executed by one of the plurality of servers.

As illustrated in FIG. 19, in step S601, transaction data, which pertains to payment processing for the payment of a token from one or more applicants to a solicitor in crowdfunding, is received, and the received transaction data is stored in the distributed ledger held in each of the plurality of servers.

In step S602, controller 13 determines whether or not the target condition of the crowdfunding has been met using a smart contract.

In step S603, information indicating a result of the determination is output.

Figure 20:
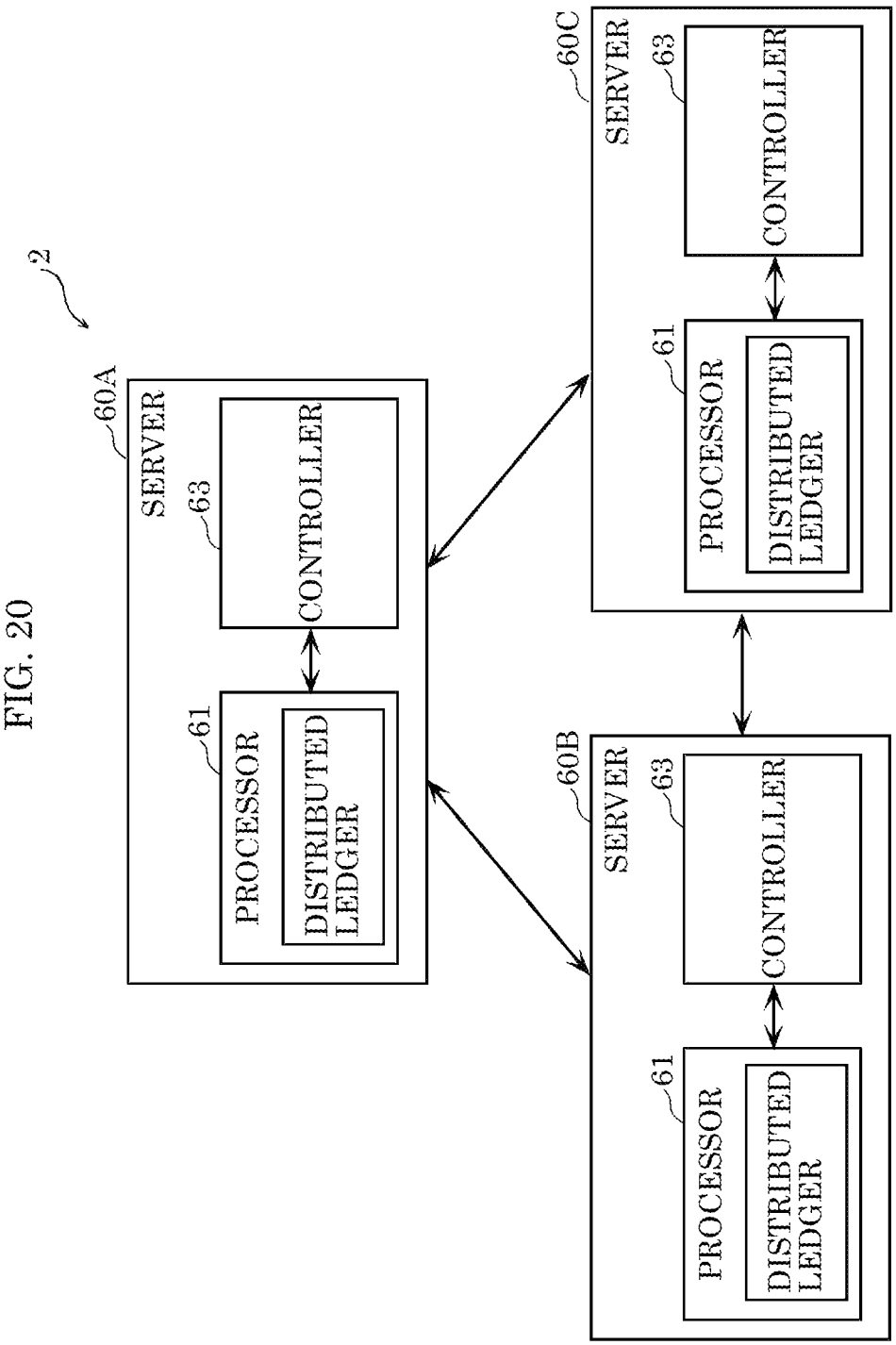
FIG. 20 is a block diagram schematically illustrating the configuration of a server according to a variation on the embodiments.

FIG. 20 is a block diagram schematically illustrating the configuration of the fund management system according to the variation on the embodiments.

Fund management system 2 illustrated in FIG. 20 includes a plurality of servers 60A, 60B, and 60C, which hold the distributed ledger.

Fund management system 2 includes processor 61 and controller 63.

Processor 61 receives transaction data, which pertains to payment processing for the payment of a token from one or more applicants to the solicitor in crowdfunding, and stores the received transaction data in the distributed ledger held in each of the plurality of servers.

Controller 63 determines whether or not the target condition of the crowdfunding has been met through a smart contract, and outputs information indicating a result of the determination.

Through this, fundraising in crowdfunding can be appropriately managed.

Supplementary descriptions of the blockchain used in the foregoing embodiments or variation will be given next.

Figure 21:
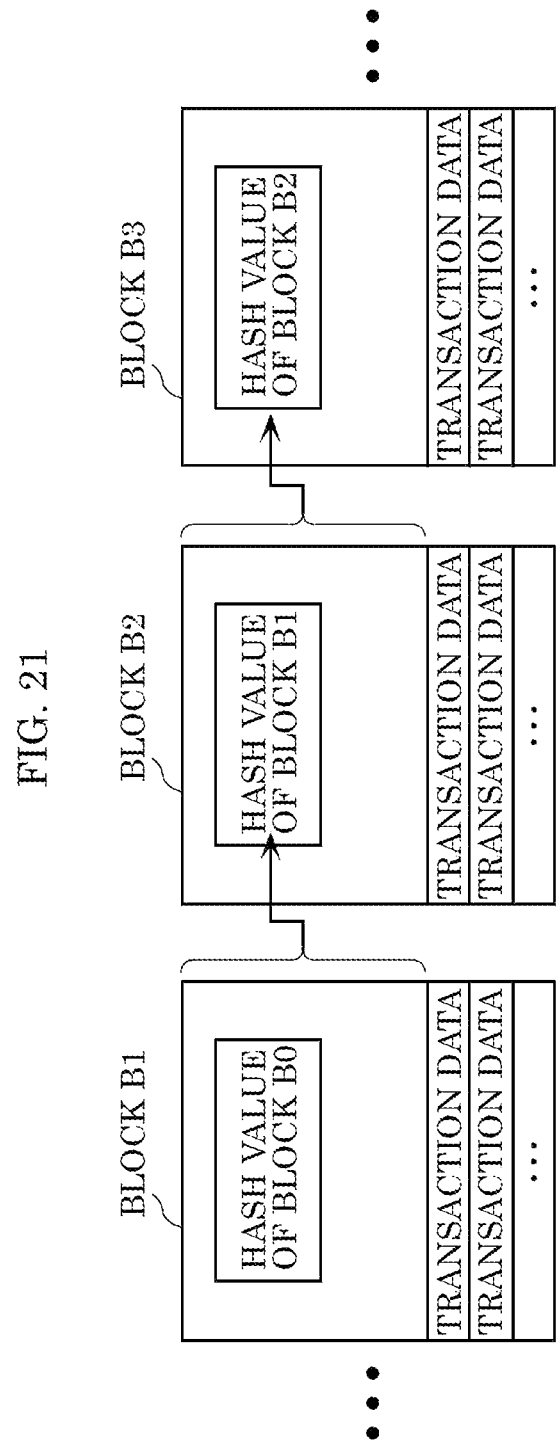
FIG. 21 is a diagram illustrating a blockchain data structure.

FIG. 21 is a diagram illustrating the data structure of the blockchain.

A "blockchain" is a connection of blocks, which serve as a unit of record, in the form of a chain. Each block includes a plurality of instances of transaction data and a hash value of the block immediately previous in the chain. Specifically, block B2 includes the hash value of block B1, which is immediately previous in the chain. A hash value computed from the plurality of instances of transaction data included in block B2 and the hash value of block B1 is then included in block B3 as the hash value of block B2. Connecting the blocks in a chain with each block including the details of the previous block as a hash value in this manner makes it possible to effectively prevent tampering with the recorded transaction data.

If, for example, a past instance of transaction data has been changed, the hash value of the block will have a value different from the pre-change value. This means that to make a block which has been tampered with appear normal, it is necessary to rebuild all the blocks previous thereto, which is a task that is extremely difficult in practice. This characteristic is used to ensure that it is difficult to tamper with the blockchain.

Figure 22:
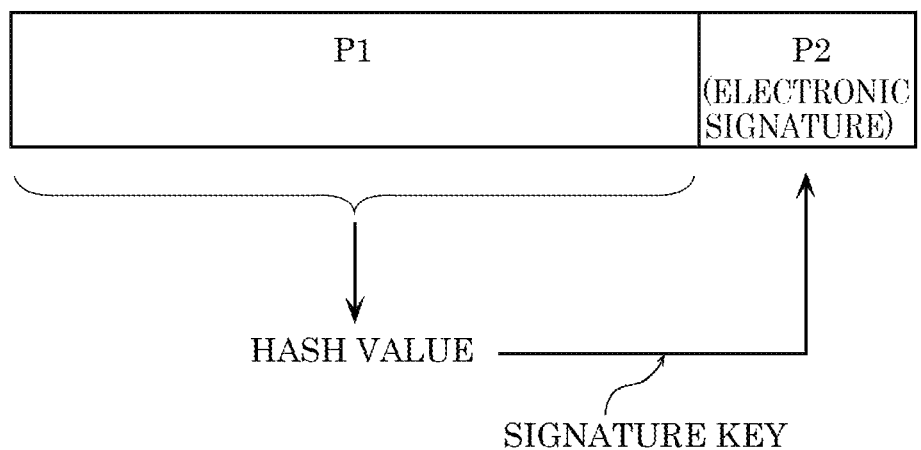
FIG. 22 is a diagram illustrating a data structure of transaction data.

FIG. 22 is a diagram illustrating the data structure of transaction data.

The transaction data illustrated in FIG. 22 contains main transaction part P1 and electronic signature P2. Main transaction part P1 is the main data of that transaction data. Electronic signature P2 is generated by signing a hash value of main transaction part P1 using a signature key of the creator of the transaction data, and to be more specific, through encryption using the creator's private key.

The transaction data has electronic signature P2 and is therefore substantially impossible to be tampered with. This prevents the transaction itself from being tampered with.

As described above, the server according to the foregoing embodiments stores information pertaining to the payment processing of tokens in crowdfunding in the distributed ledger as the transaction data. Because it is substantially impossible to tamper with transaction data which has been stored in a distributed ledger, the information pertaining to the payment processing of tokens in crowdfunding is appropriately managed. Additionally, the determination as to whether or not the target condition of the crowdfunding has been met is made through a smart contract, and the determination can therefore be made automatically and securely without going through another party or another system. Accordingly, the control method according to the present disclosure can appropriately manage fundraising in crowdfunding.

Additionally, the server determines whether or not the target condition has been met by comparing the total of the tokens paid through the payment processing with the target amount at the point in time when a predetermined solicitation period of the crowdfunding ends, and thus the determination can be made more easily. Accordingly, the control method according to the present disclosure can appropriately manage fundraising in crowdfunding more easily.

Additionally, the server determines whether or not the target condition has been met by comparing the total of the tokens paid through the payment processing with the target amount at the point in time when transaction data involved in the payment processing is received, and thus the determination can be made more easily. Accordingly, the control method according to the present disclosure can appropriately manage fundraising in crowdfunding more easily.

Additionally, the server also executes the reimbursement processing of tokens, using the smart contract, when the target condition of the crowdfunding is not met. The reimbursement processing of the tokens is therefore made automatically and securely without going through another party or another system. Accordingly, the control method according to the present disclosure can appropriately manage fundraising in crowdfunding.

Additionally, the server appropriately manages information pertaining to payment processing in which each of the one or more applicants pays a predetermined amount of tokens. Accordingly, the control method according to the present disclosure can appropriately manage fundraising in crowdfunding.

Additionally, the server appropriately manages information pertaining to payment processing in which each of the one or more applicants pays an amount of tokens obtained by equally distributing a predetermined amount of tokens among the one or more applicants. Accordingly, the control method according to the present disclosure can appropriately manage fundraising in crowdfunding.

Additionally, the payment amount for the applicant is determined so as not to exceed the specified amount specified by each applicant. Accordingly, the control method according to the present disclosure can appropriately manage fundraising in crowdfunding while keeping the payment amount within a range that does not exceed a maximum amount.

Additionally, a contract code of the smart contract used in the process of determining whether or not the target condition has been met can be generated by the solicitor. Accordingly, by generating a contract code reflecting the intentions of the solicitor, a conditional determination which further reflects the intentions of the solicitor can be made. Accordingly, the control method according to the present disclosure can appropriately manage fundraising in crowdfunding while making it possible to further reflect the intentions of the solicitor.

Additionally, the server stores the data in the distributed ledger after the consensus algorithm is executed. Accordingly, by executing the consensus algorithm, the fundraising in the crowdfunding can be managed appropriately more easily.

In the foregoing embodiments, the constituent elements are constituted by dedicated hardware. However, the constituent elements may be realized by executing software programs corresponding to those constituent elements. Each constituent element may be realized by a program executing unit such as a CPU or a processor reading out and executing a software program recorded into a recording medium such as a hard disk or semiconductor memory. Here, the software that realizes the fund management system and the like according to the foregoing embodiments is a program such as that described below.

In other words, the program is a program that causes a computer to execute a control method of a fund management system including a plurality of servers that hold a distributed ledger. The control method is executed by one of the plurality of servers. The control method includes: receiving transaction data, the transaction data pertaining to payment processing for payment of a token from one or more applicants of crowdfunding to a management account, and storing the transaction data that has been received in the distributed ledger held in each of the plurality of servers; determining, using a smart contract, whether or not a target condition of the crowdfunding has been met; and outputting information indicating a result of the determining.

A fund management system and the like according to one or more aspects have been described based on embodiments, but the present disclosure is not limited to these embodiments. Variations on the embodiments conceived by one skilled in the art, embodiments implemented by combining constituent elements from different other embodiments, and the like may be included in the scope of one or more aspects as well, as long as they do not depart from the essential spirit of the present disclosure.

Although only some exemplary embodiments of the present disclosure have been described in detail above, those skilled in the art will readily appreciate that many modifications are possible in the exemplary embodiments without materially departing from the novel teachings and advantages of the present disclosure. Accordingly, all such modifications are intended to be included within the scope of the present disclosure.

INDUSTRIAL APPLICABILITY

The present disclosure can be used in fund management systems that appropriately manage fundraising performed in crowdfunding.

What is claimed is:

1. A control method of a fund management system including a plurality of servers that hold a distributed ledger, the control method being executed by one of the plurality of servers, the control method comprising:
receiving transaction data having a data structure, wherein the data structure includes identification information that uniquely identifies a project of crowdfunding, an identifier of an account of an applicant of a plurality of applicants who pays a token to the project of crowdfunding, an identifier of a management account that receives payment of the token, information indicating an amount of tokens paid by the applicant through the distributed ledger, and an electronic signature of the applicant through the distributed ledger, wherein the transaction data pertaining to payment processing for payment of the token from the applicant, wherein the electronic signature is generated through encryption of data included in the transaction data using a private key of a creator that created the transaction data, wherein the payment processing comprises processing the amount of tokens paid by the applicant;
storing the transaction data in the distributed ledger held in each of the plurality of servers;
receiving, from a first terminal of a solicitor, a target condition of the project of crowdfunding determined by a contract code, of a smart contract, generated by the first terminal based on one or more conditions set by a second terminal of a provider;
determining, using the smart contract, whether or not the target condition of the crowdfunding is met; and
outputting information indicating a result of the determining;
determining, based on the target condition determined using the smart contract, of the project of crowdfunding being met, a payment amount per applicant of the one or moreplurality of applicants that does not exceed a maximum amount of tokens which the applicant of the plurality of applicants is capable of paying;
generating reimbursement transaction data for returning a reimbursement amount;
storing the generated reimbursement transaction in the distributed ledger held in each of the one of the plurality of servers; and
sending, based on the target condition of the project of crowdfunding being met, a notification that payment is complete to the second terminal so as to cause the second terminal to provide content of the project of crowdfunding to the applicant for use by the applicant.

2. The control method according to claim 1, wherein whether or not the target condition has been met is determined by determining whether or not a total of tokens paid through the payment processing involving the transaction data received during a solicitation period of the project of crowdfunding is at least a target amount of the project of crowdfunding at a point in time when the solicitation period ends.

3. The control method according to claim 1, wherein whether or not the target condition has been met is determined by determining, when the transaction data is received, whether or not a total of tokens paid through payment processing involving past transaction data, the past transaction data being transaction data received before the transaction data is received, is at least a target amount of the project of crowdfunding.

4. The control method according to claim 1,
wherein when a determination that the target condition is not met is made, the control method further comprises:
generating, based on information indicating a result of the determination, transaction data pertaining to reimbursement processing of reimbursing each of the plurality of applicants from the management account with a token paid to the management account through the payment processing; and
storing the transaction data that has been generated in the distributed ledger held in each of the plurality of servers.

5. The control method according to claim 1,
wherein the transaction data pertaining to the payment processing includes a predetermined amount of tokens to be paid by each of the plurality of applicants, and
the payment processing is processing in which each of the plurality of applicants pays the predetermined amount of tokens.

6. The control method according to claim 1, wherein
the reimbursement amount is an amount of tokens obtained by subtracting, from the maximum amount of tokens, an amount obtained by equally dividing a target amount of the project of crowdfunding among the plurality of applicants.

7. The control method according to claim 6,
when an amount of tokens obtained by equally dividing the target amount of the project of crowdfunding among the plurality of applicants exceeds the amount of tokens paid by one applicant of the plurality of applicants through the payment processing, the one applicant is excluded from the plurality of applicants, and the target amount of the project of crowdfunding is equally divided among the plurality of applicants aside from the one applicant.

8. The control method according to claim 1, further comprising:
generating, by the first terminal of the project of crowdfunding, a code pertaining to the smart contract; and
storing transaction data including the code that has been generated in the distributed ledger held in each of the plurality of servers.

9. The control method according to claim 1,
wherein when storing the transaction data in the distributed ledger held in the plurality of servers, the transaction data is stored in the distributed ledger after each of the plurality of servers executes a consensus algorithm.

10. A fund management system including a plurality of servers that hold a distributed ledger, the fund management system comprising:
a processor that:
receives transaction data having a data structure, wherein the data structure includes an identification information that uniquely identifies a project of crowdfunding, an identifier of an account of an applicant of a plurality of applicants who pays a token to the project of crowdfunding, an identifier of a management account that receives payment of the token, information indicating an amount of tokens paid through the distributed ledger by the applicant, and an electronic signature of the applicant, wherein the transaction data pertaining to payment processing for payment of the token from the applicant, wherein the electronic signature is generated through encryption of data included in the transaction data using a private key of a creator that created the transaction data, wherein the payment processing comprises processing the amount of tokens paid by the applicant; and
a controller that:
receives, from a first terminal of a solicitor, a target condition of the project of crowdfunding determined by a contract code, of a smart contract, generated by the first terminal based on one or more conditions set by a second terminal of a provider;
determines, using the smart contract, whether or not a target condition of the project of crowdfunding has been met;
outputs information indicating a result of the determination; and
determines, based on the target condition determined using the smart contract, of the project of crowdfunding being met, a payment amount per applicant of the plurality of applicants that does not exceed a maximum amount of tokens which the applicant of the plurality of applicants is capable of paying;
generates a reimbursement transaction data for returning a reimbursement amount;
stores the generated reimbursement transaction in the distributed ledger held in each of the one of the plurality of servers; and
sends, based on the target condition of the project of crowdfunding being met, a notification that payment is complete to the second terminal so as to cause the second terminal to provide content of the project of crowdfunding to the applicant for use by the applicant.

11. A non-transitory computer-readable recording medium in which is recorded a program for causing a computer to execute the control method according to claim 1.

12. The control method according to claim 1, further comprising:
transmitting the transaction data to the plurality of servers via a network; and
storing the transaction data in the distributed ledger.

13. The control method according to claim 1,
wherein when storing the transaction data in the distributed ledger held in the plurality of servers, a block including the transaction data is generated, and the block is stored in the distributed ledger after each of the plurality of servers executes a consensus algorithm regarding the block generated.

14. The control method according to claim 1,
wherein an amount of tokens paid in payment processing by any one of the plurality of applicants is different from an amount of tokens paid in payment processing by another one of the plurality of applicants.

* * * * *